United States Patent [19]
Taku

[11] Patent Number: 5,937,222
[45] Date of Patent: *Aug. 10, 1999

[54] DEVICE FOR LOADING FILM CARTRIDGE HAVING MOVABLE LIGHT-SHIELD COVER

[75] Inventor: Masakazu Taku, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/896,431

[22] Filed: Jul. 17, 1997

Related U.S. Application Data

[63] Continuation of application No. 08/420,049, Apr. 11, 1995, abandoned.

[30] Foreign Application Priority Data

Apr. 21, 1994 [JP] Japan .................................. 6-105042

[51] Int. Cl.⁶ .................................................. G03B 19/10
[52] U.S. Cl. ................................................... 396/538
[58] Field of Search ........................... 396/538, 535

[56] References Cited

U.S. PATENT DOCUMENTS

| | | | |
|---|---|---|---|
| 3,672,279 | 6/1972 | Hackenberg et al. | 354/275 |
| 4,221,479 | 9/1980 | Harvey | 354/275 |
| 4,913,368 | 4/1990 | Atkinson | 242/71.1 |
| 5,049,914 | 9/1991 | Dassero | 354/288 |
| 5,142,316 | 8/1992 | Tanii et al. | 354/288 |
| 5,155,514 | 10/1992 | Tamamura | 354/174 |
| 5,231,438 | 7/1993 | Smart | 354/281 |
| 5,394,213 | 2/1995 | Hazama et al. | 354/288 |
| 5,430,515 | 7/1995 | Lawther et al. | 354/275 |
| 5,440,364 | 8/1995 | Takahashi | 354/288 |
| 5,477,295 | 12/1995 | Lawther et al. | 354/288 |

FOREIGN PATENT DOCUMENTS

| | | |
|---|---|---|
| 4-90530 | 3/1992 | Japan . |
| 6-35121 | 2/1994 | Japan . |
| WOA9000759 | 1/1990 | WIPO . |

*Primary Examiner*—Eddie C. Lee
*Assistant Examiner*—Michael Dalakis
*Attorney, Agent, or Firm*—Fitzpatrick, Cella, Harper & Scinto

[57] ABSTRACT

In an apparatus such as a camera adapted for an image recording medium cartridge having a cover for opening and closing an opening part for passing an image recording medium and an operation part for operating the cover, there are provided a first member for actuating the operation part of the cartridge and a second member for causing the operation part of the cartridge and the first member to engage each other according to closing of a cover of a cartridge chamber in which the cartridge is loaded.

56 Claims, 23 Drawing Sheets

DEVICE FOR LOADING FILM CARTRIDGE HAVING MOVABLE LIGHT-SHIELD COVER

This application is a continuation of U.S. application Ser. No. 08/420,049 filed Apr. 11, 1995, now abandoned.

BACKGROUND OF THE INVENTION

1. Field of the Invention

This invention relates to an improvement on the film cartridge loading device of a camera adapted to use a film cartridge having a movable light-shield cover.

2. Description of the Related Art

Some of the known cameras have been arranged to have a restricting member for preventing the camera from being loaded with any film cartridge that contains a partly exposed film, as disclosed in Japanese Laid-Open Patent Application No. HEI 6-35121.

Meanwhile, Japanese Laid-Open Patent Application No. HEI 4-90530 has disclosed a camera arranged to use a spring for ejecting a film cartridge in conjunction with a cartridge chamber lid.

In the case of the camera disclosed in Japanese Laid-Open Patent Application No. HEI 6-35121, restriction imposed by the loading restricting member is canceled if the film contained in the film cartridge has not been exposed. Then, even if the cartridge chamber lid is open, a driving member which is arranged on the side of the camera to transmit power to a cover for shielding a film exit-and-entrance opening from light and a mechanism for opening and closing the opening (hereinafter referred to as active light lock and abbreviated to ALL) which are provided on the film cartridge comes to engage the ALL to unlock a lock member of the ALL when the film cartridge is loaded. However, the camera of this kind has presented a problem in that the lock member of the ALL tends to cease to function due to occurrence of a plastic deformation or a crack if it is kept in an unlocked state.

Meanwhile, the latter patent application, Japanese Laid-Open Patent Application No. HEI 4-90530, which relates to a camera having the ejector has disclosed nothing about an engaging relation between the ALL disposed on the film cartridge and the driving member disposed on the side of the camera. The latter camera, therefore, has the same problem as the former.

SUMMARY OF THE INVENTION

In accordance with one aspect of this invention, an apparatus such as a camera adapted for an image recording medium cartridge having a cover for opening and closing an opening part for passing an image recording medium and an operation part for operating the cover, comprises first means for actuating the operation part of the cartridge and second means for causing the first means and the operation part of the cartridge to engage each other according to closing of a cover of a cartridge chamber in which the cartridge is loaded, whereby the operation part of the cartridge is prevented from malfunctioning.

Other aspects of this invention will become apparent from the following detailed description of preferred embodiments thereof.

DETAILED DESCRIPTION OF PREFERRED EMBODIMENTS

Preferred embodiments of this invention are described by way of example below with reference to the accompanying drawings.

Figure 5:
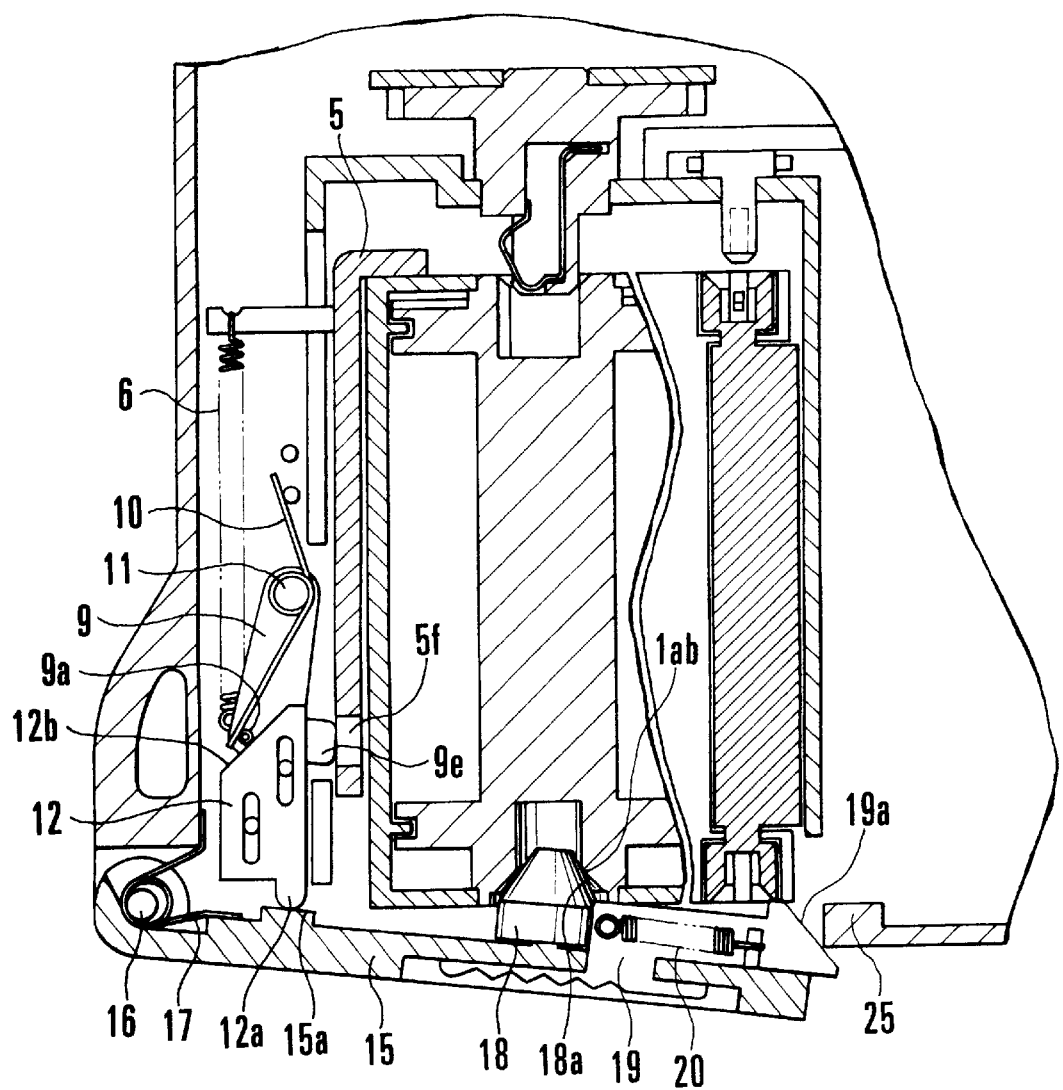
FIG. 5 is a vertical sectional view showing the camera in a state obtained when the cartridge chamber lid is closed further from its position shown in FIG. 4.
Figure 6:
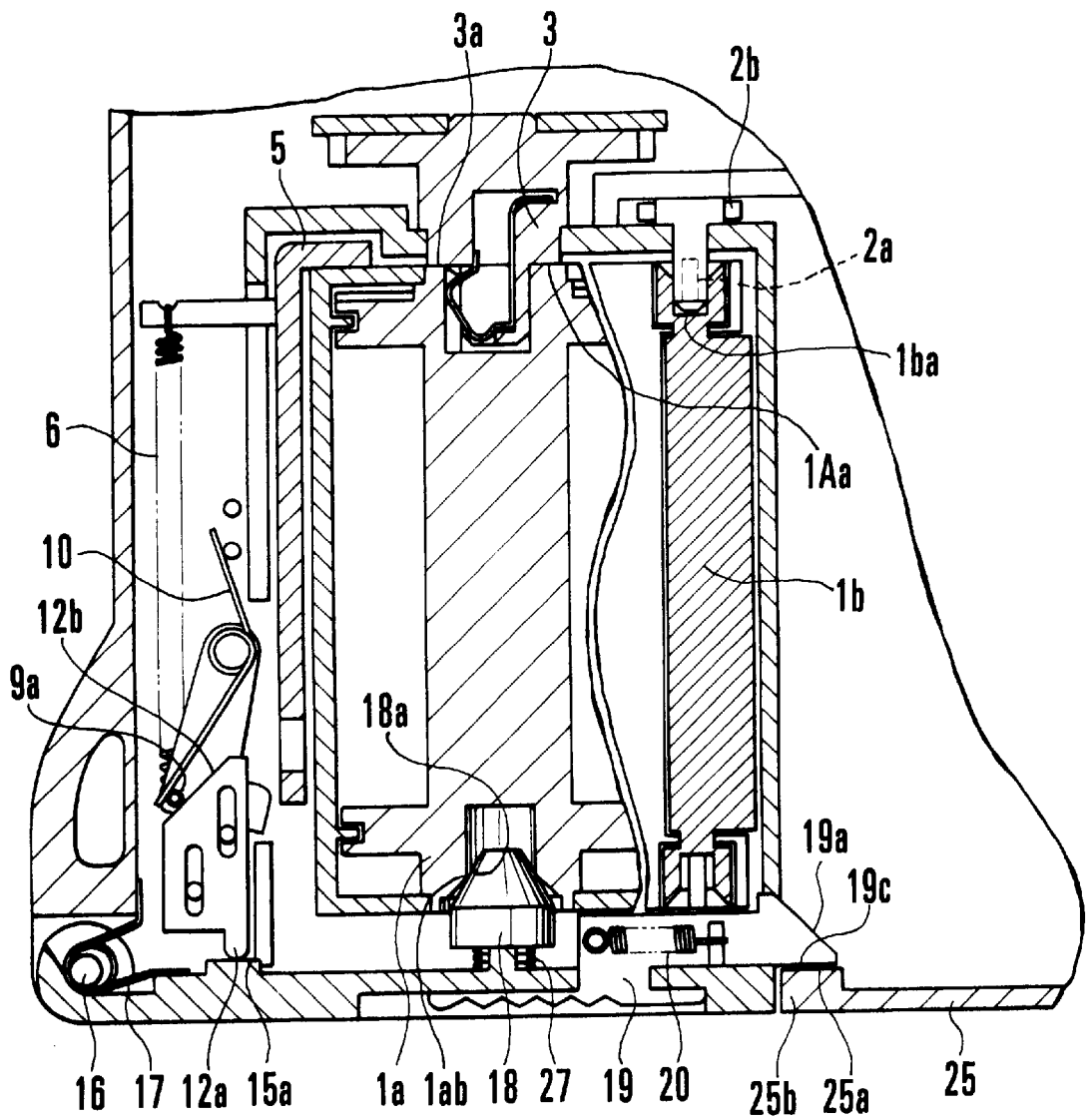
FIG. 6 is a vertical sectional view showing the camera in a state obtained when the cartridge chamber lid comes to be locked from its position shown in FIG. 5.
Figure 7:
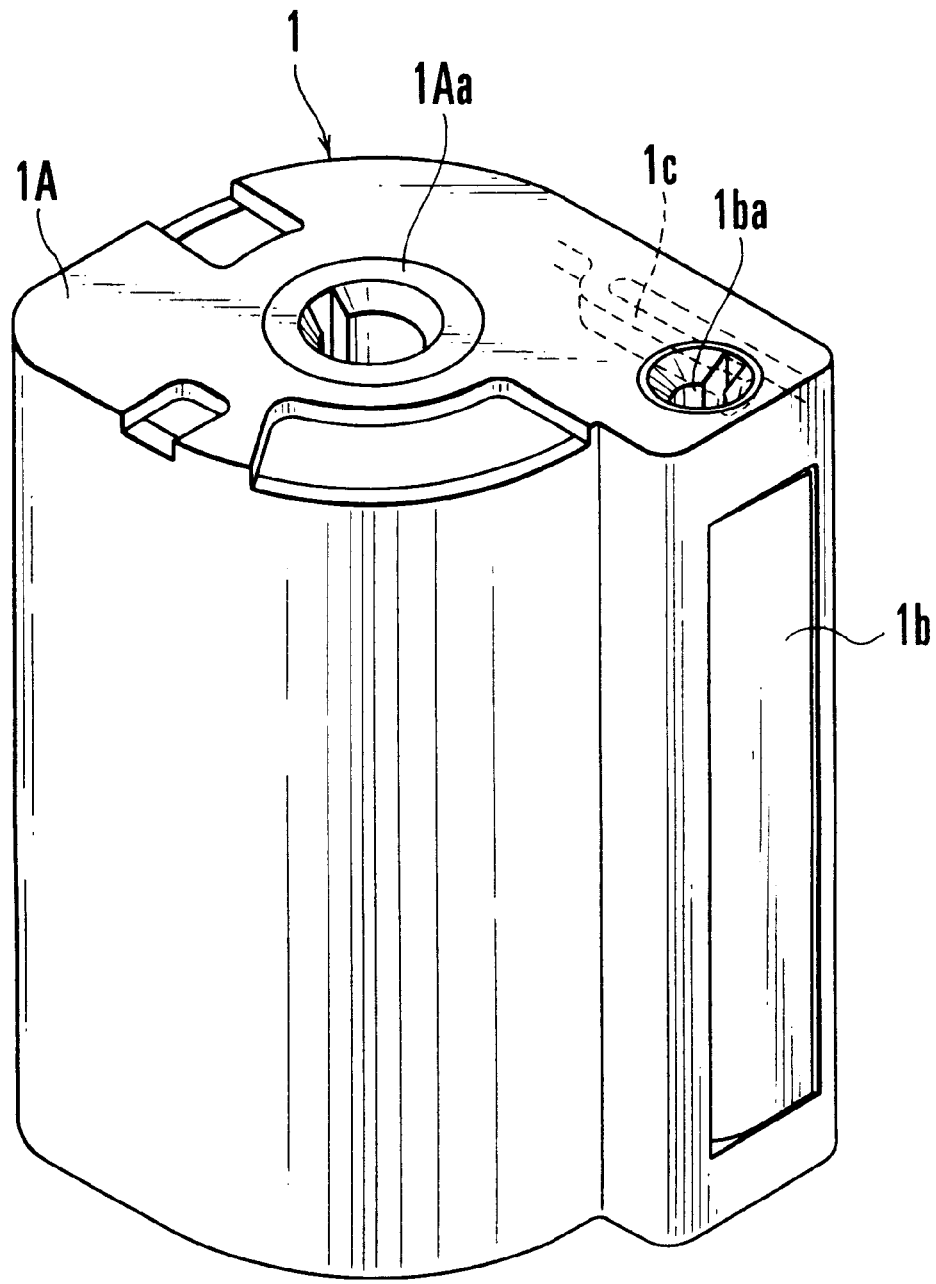
FIG. 7 is an oblique view showing the appearance of a film cartridge to be used by each of embodiments of this invention.
Figure 8:
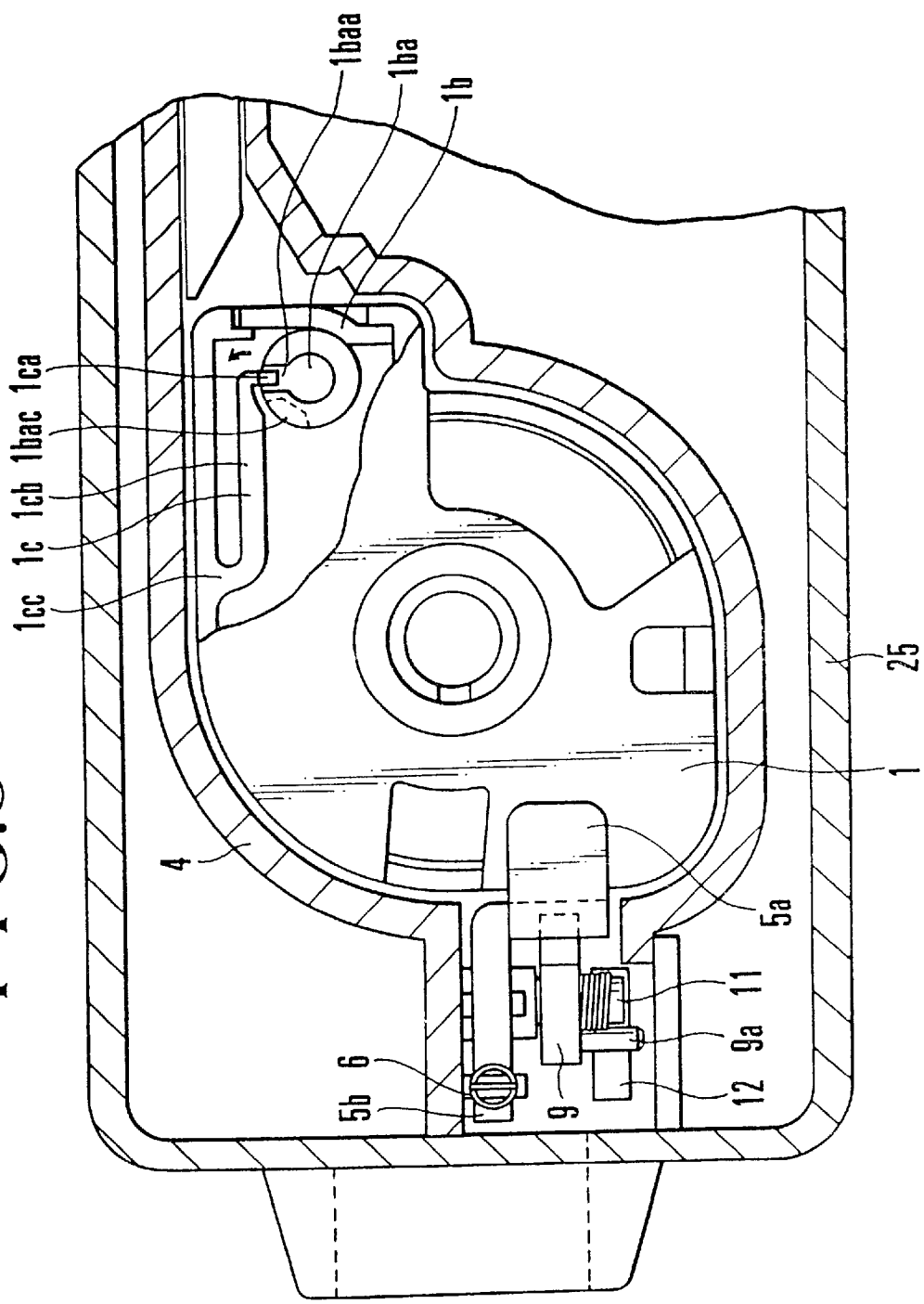
FIG. 8 is a transverse sectional view showing a state obtained around the cartridge chamber when the cartridge chamber lid of the camera which is the first embodiment of this invention is open.
Figure 9:
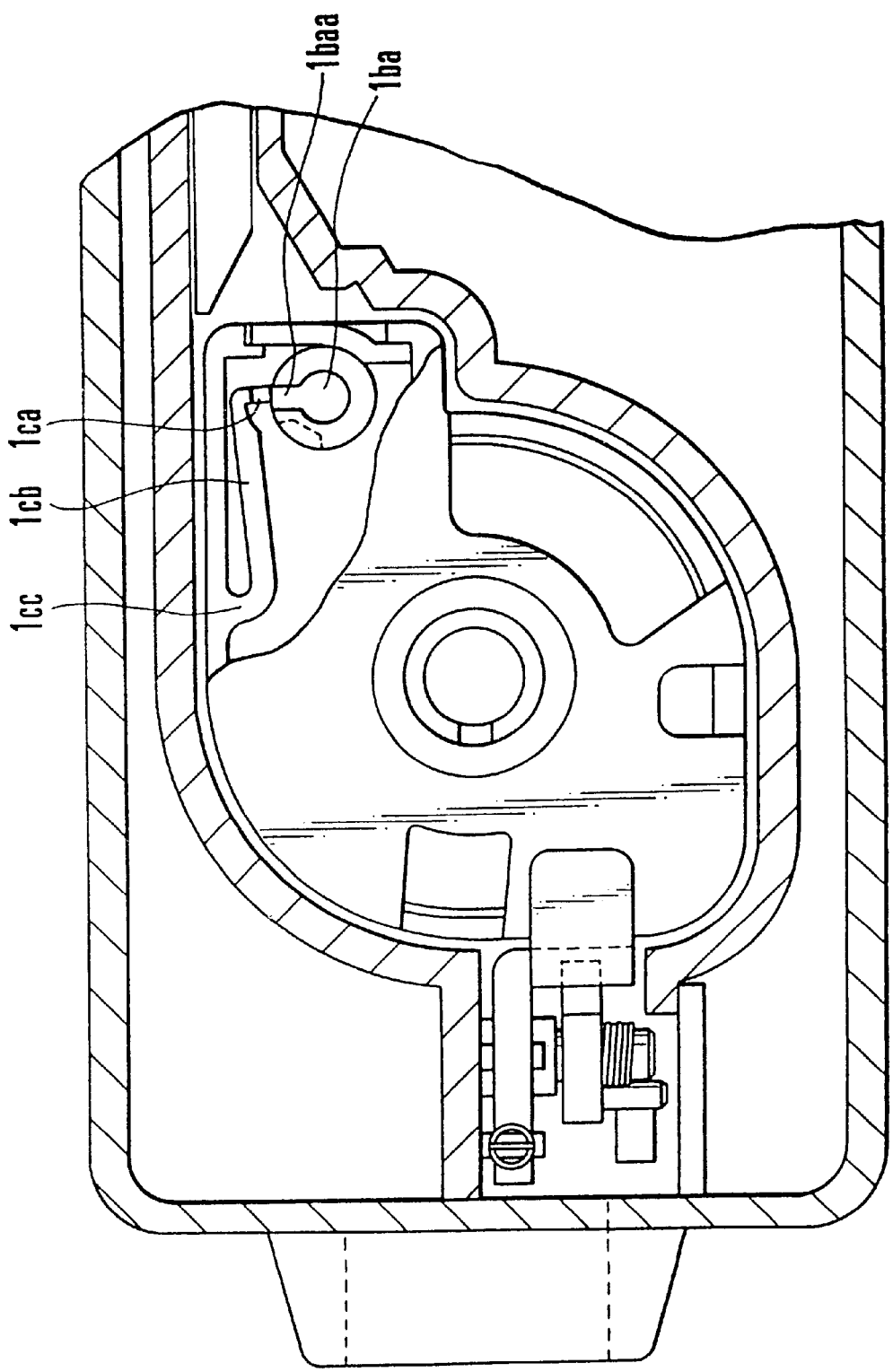
FIG. 9 is a transverse sectional view showing a state obtained when a driving member disposed on the side of the camera comes to begin to engage an ALL with the cartridge chamber lid closed from its position of FIG. 8.
Figure 10:
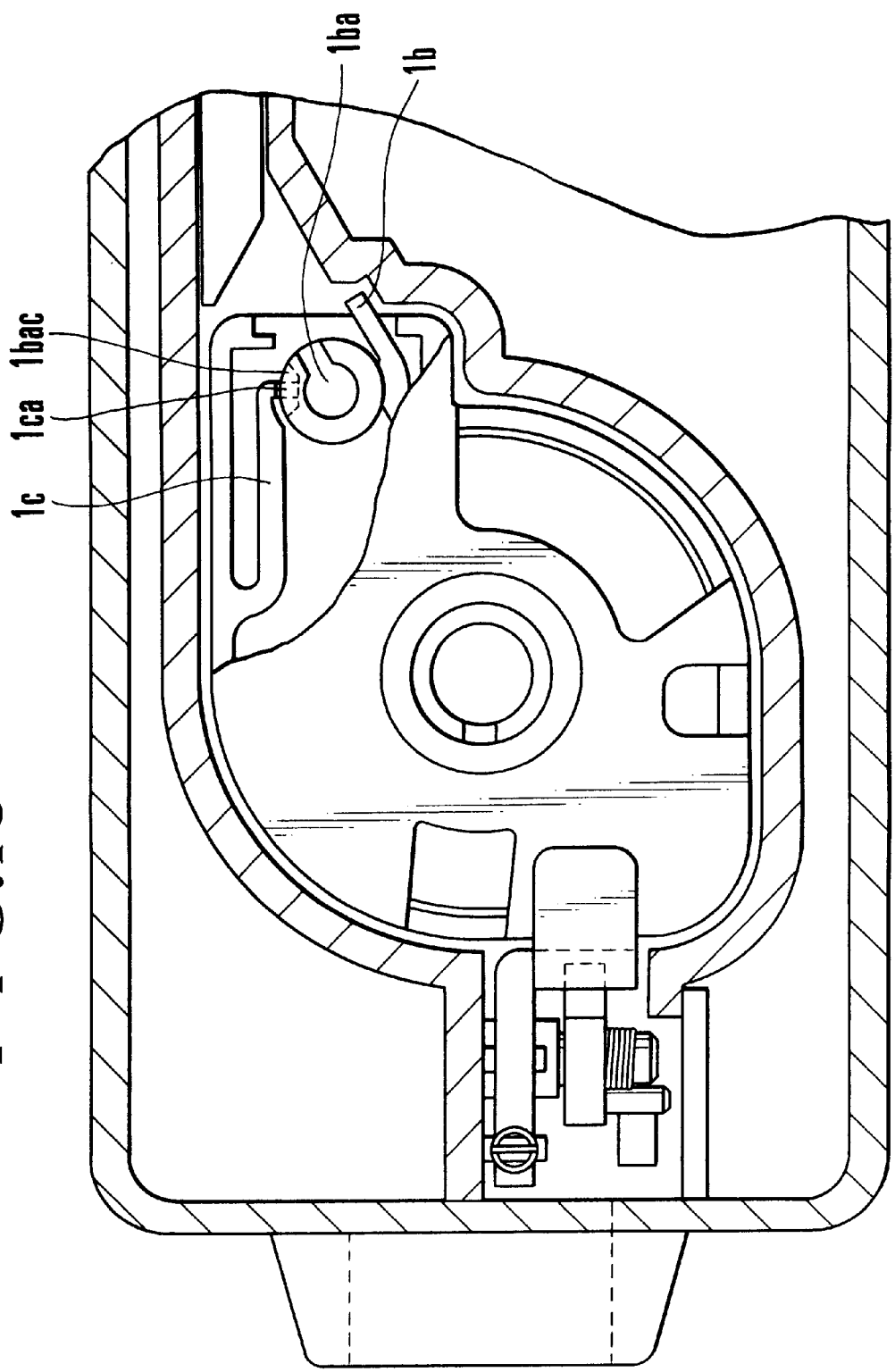
FIG. 10 is a transverse sectional view showing a state obtained when the driving member of the camera comes to completely engage the ALL from its position of FIG. 9.
Figure 11:
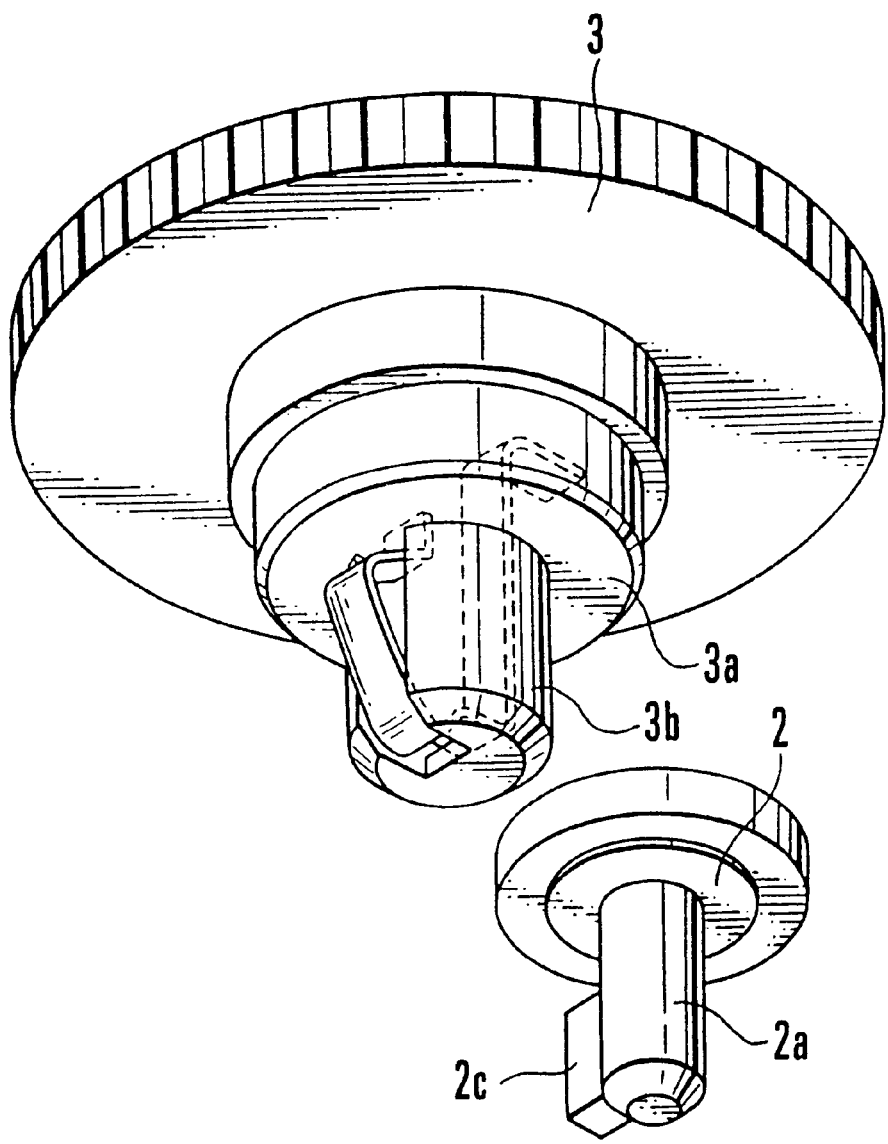
FIG. 11 is an oblique view showing a fork gear and a driving member disposed on the side of the camera which is the first embodiment of this invention.

FIGS. 1 to 11 show a camera arranged as a first embodiment of this invention. Of these figures, FIGS. 1 to 6 show the camera in varied states obtained when the camera is loaded with a film cartridge. FIG. 7 shows in an oblique view the appearance of the film cartridge. FIGS. 8 to 10 are top views showing the internal arrangement of the film cartridge with a portion of the camera removed. FIG. 11 is an oblique view showing the structure of a driving member and that of a fork gear.

Figure 1:
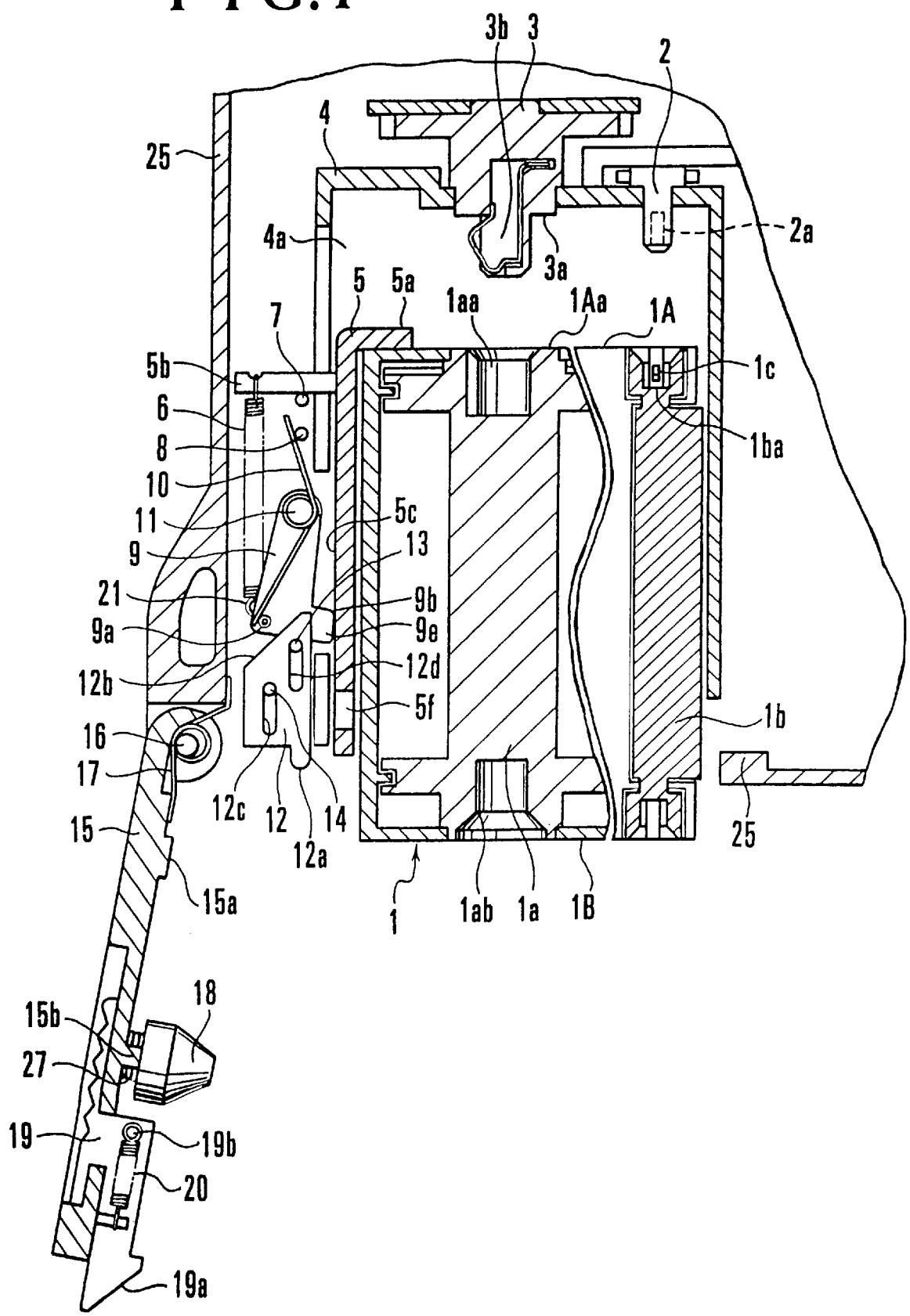
FIG. 1 a vertical sectional view showing a cartridge chamber and parts around it of a camera arranged according to this invention as a first embodiment thereof.
Figure 2:
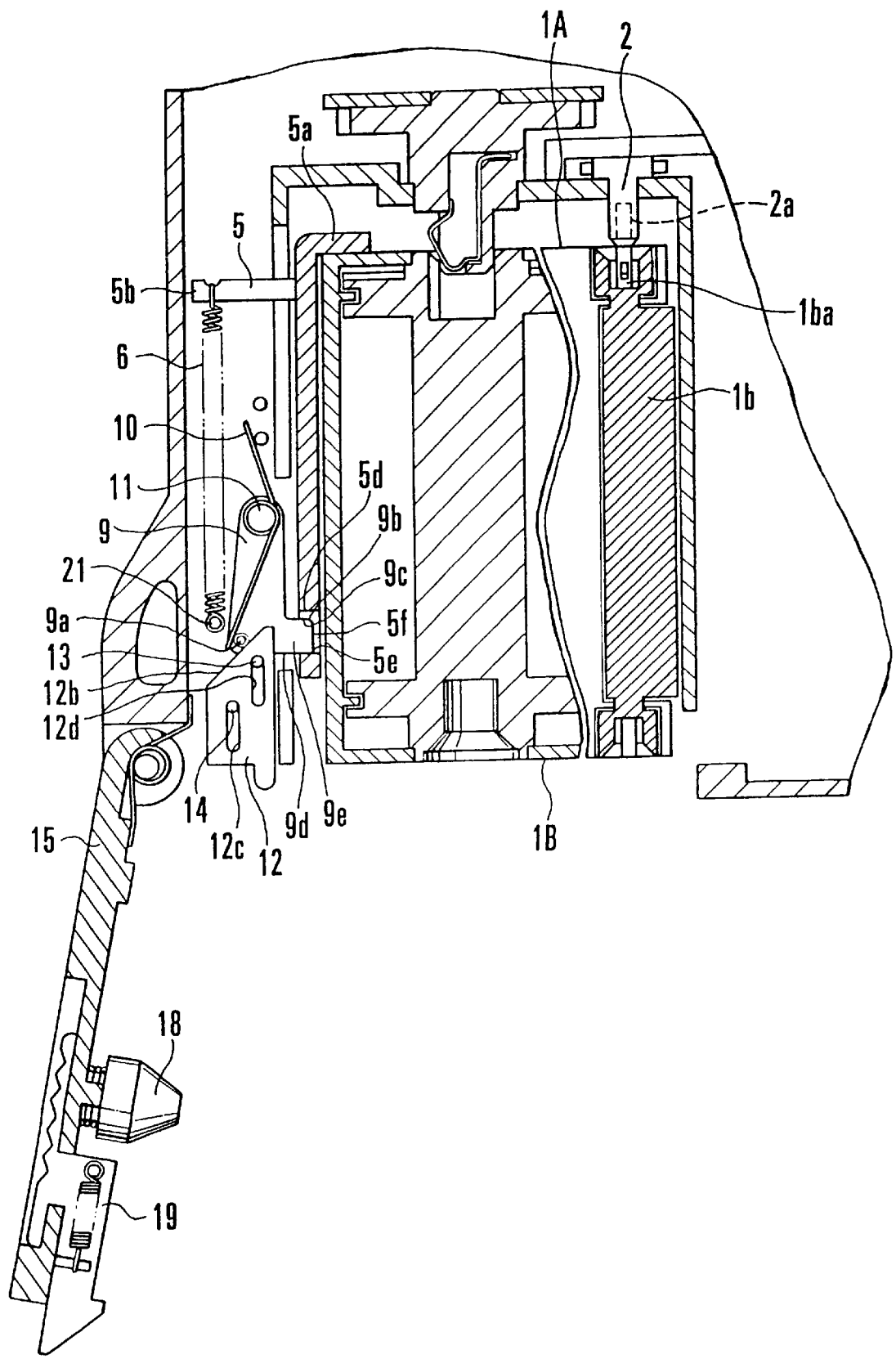
FIG. 2 is a vertical sectional view showing the same camera in a state obtained when a film cartridge is pushed in from its position shown in FIG. 1.

Referring to these drawings, a film cartridge 1 is arranged as shown in FIG. 7. As shown in FIGS. 1, 7, 8, etc., the film cartridge 1 has a take-up spool 1a on which a film (not shown) serving as an image recording medium is wound, an ALL 1b, a lock member 1c for locking the ALL 1b, an engaging part 1ba of the ALL 1b in which an engaging part 2a of a driving member 2 (see FIGS. 1 and 11) is to be inserted, and an engaging part 1aa in which an engaging part 3b of a fork gear 3 is to be inserted. The film cartridge 1 is further provided with a face 1A including a face 1Aa which is arranged to abut on a datum face 3a of the fork gear 3 upon completion of loading the film cartridge and another face 1B which is disposed on one side opposite to the face 1A. A camera body 4 includes a cartridge chamber 4a which is arranged to have the film cartridge 1 axially inserted into it. An eject lever 5 which is provided for ejecting the film cartridge 1 is mounted to be slidable up and down with respect to the body 4. A spring 6 is stretched between a pin 21 on the body 4 and a spring hooking part 5b and is arranged to constantly urge the eject lever 5 downward, i.e., in the direction of ejecting. A stopper pin 7 which is provided on the body 4 is arranged to prevent the eject lever 5 from moving further down from its eject position by causing the spring hooking part 5b of the eject lever 5 to abut on the stopper pin 7. Further, a hook part 5a of the eject lever 5 is arranged to be hooked on the face 1A of the film cartridge 1. The eject lever 5 is thus arranged such that, when the film cartridge 1 is pushed in, the eject lever 5 moves upward together with the film cartridge 1. A stop lever 9 is arranged to control the motion of the eject lever 5 and is swingably supported by a shaft 11 provided on the body 4. A torsion spring 10 is arranged between a pin 9a secured to the stop lever 9 and the pin 8 on the camera body 4 to constantly urge the stop lever 9 to swing counterclockwise on the shaft 11 of the body 4. The stop lever 9 includes a hook part 9e consisting of an R part 9b which abuts on one side face 5c of the eject lever 5, as shown in FIG. 1, and faces 9c and 9d which are arranged to abut on stopper faces 5d and 5e of the eject lever 5, as shown in FIG. 2.

A cam plate 12 is slidable up and down as viewed on FIG. 1 and is provided with slots 12c and 12d in which pins 13 and 14 on the body 4 are fitted. The cam plate 12 is further provided with an R projection 12a which is arranged to be pushed by a pushing-up face 15a of a cartridge chamber lid 15 while the cartridge chamber lid 15 is being closed and a cam face 12b which is arranged to abut on the pin 9a of the stop lever 9 when the cam plate 12 moves upward as viewed on FIG. 1. When the hook part 9e of the stop lever 9 is located between the stopper faces 5d and 5e of the eject lever 5 as shown in FIG. 2, the pin 9a abuts on the cam face 12b to serve as a stopper with the cam plate 12 in its lowest position. The cam plate 12 is slidable as much as the length of the slots 12c and 12d but is not urged by any urging force. In a case where the pin 9a of the stop lever 9 is pushed by the torsion spring 10 against the cam face 12b as shown in FIG. 2, the cam plate 12 receives an urging force exerted downward.

The cartridge chamber lid 15 is swingably supported by a shaft 16 and is constantly urged by a spring 17 to move in the direction of opening. The cartridge chamber lid 15 has a shaft 15b on which a cartridge pushing member 18 is rotatably supported and which is provided with a spring 27. The spring 27 is arranged to make the cartridge pushing member 18 to be movable also up and down, as shown in FIGS. 5 and 6, and, when the cartridge chamber lid 15 is closed, to urge the film cartridge 1 to move upward to have its abutting face 1Aa to abut on the datum face 3a of the fork gear 3, against the force of the spring 6 of the eject lever 5, as shown in FIG. 6. The cartridge chamber lid 15 is provided with a lid opening-and-closing knob 19. The knob 19 is provided with a lock claw which consists of a slanting face 19a and a lock claw face 19c. The lock claw is arranged to keep the cartridge chamber lid 15 in its closed position in conjunction with a face 25a of a cover 25 as shown in FIG. 6. A spring 20 is arranged to constantly urge the lock claw in the direction of locking (to the right as viewed on FIG. 6.)

While the arrangement of the embodiment is as described above, its actions to be performed from the commencement of loading the film cartridge 1 until the cartridge chamber lid 15 is locked at the end of loading are described with reference to FIGS. 1 to 6 as follows:

FIG. 1 shows the camera in a state obtained at the commencement of loading the film cartridge 1 by inserting it into the cartridge chamber 4a with the cartridge chamber lid 15 opened. When a face 1B of the film cartridge 1 is pushed in with a finger or the like, there is obtained a state as shown in FIG. 2. The R face 9b of the stop lever 9 is abutting on the face 5c of the eject lever 5 in the state of FIG. 1, when the face 1B of the film cartridge 1 is pushed in. In other words, when the face 1B is moved upward as viewed on FIG. 1, the hook part 5a of the eject lever 5 is pushed by the face 1A of the film cartridge 1. The eject lever 5 thus moves upward along with the ascent of the film cartridge 1. Then, since the stop lever 9 is constantly urged counterclockwise by the spring 10, the hook part 9e of the stop lever 9 comes between the stop faces 5d and 5e, i.e., comes into a hole part 5f of the eject lever 5, when the eject lever 5 comes to its position of FIG. 2. As a result, even if the face 1B of the film cartridge 1 is pushed further, the face 1B cannot be moved further inward as the face 9d of the stop lever 9 is abutting on the stopper face 5e of the eject lever 5. As is apparent from FIG. 2, the engaging part 1ba of the ALL 1b is not engaging the engaging part 2a of the driving member 2 in this state.

Figure 3:
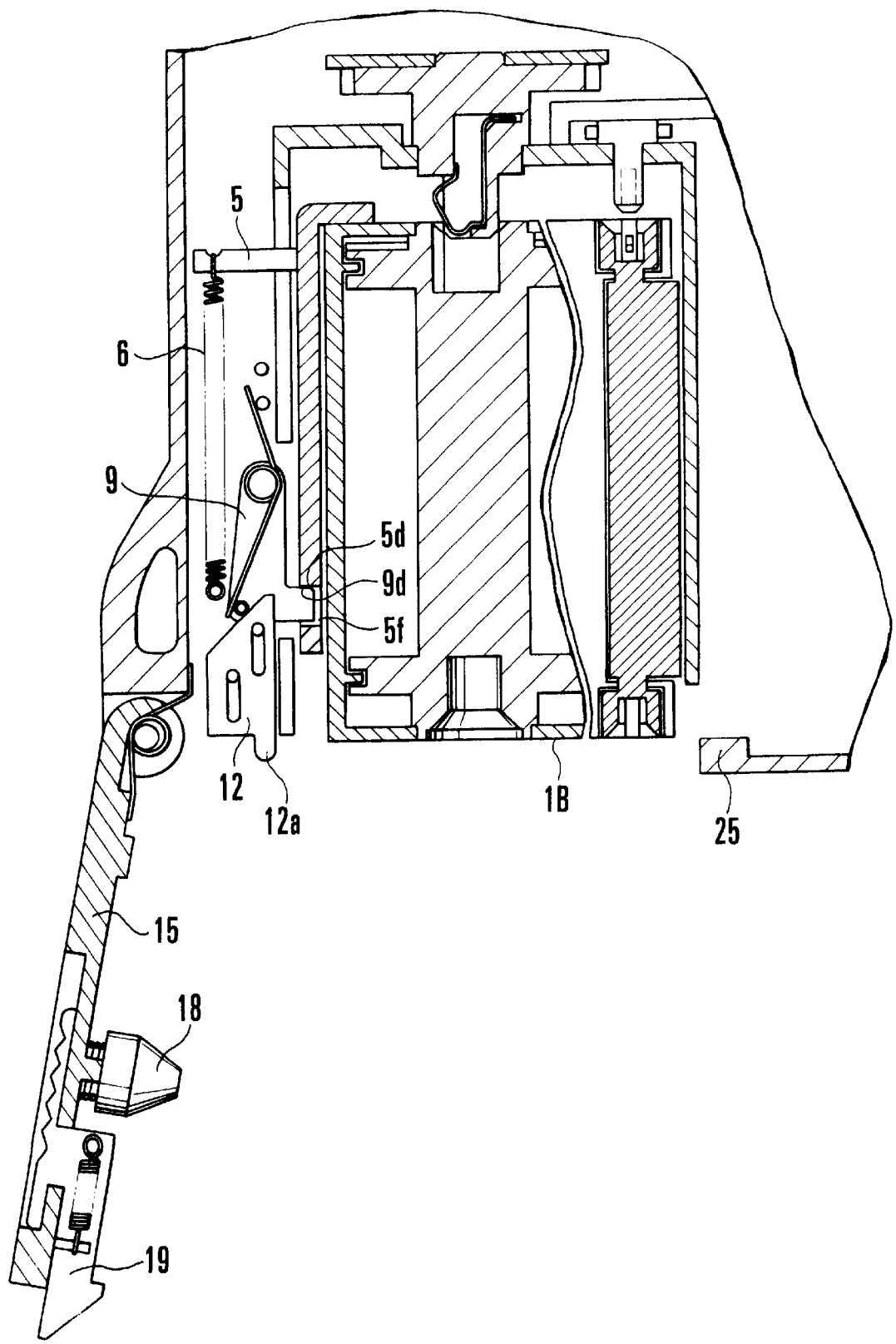
FIG. 3 is a vertical sectional view showing the camera in a state obtained when the film cartridge is released from pushing pressure in the state of FIG. 2.

When the finger which has been pushing the face 1B of the film cartridge 1 is detached from the face 1B in the state shown in FIG. 2, the stopper face 5d of the hole 5f formed in the eject lever 5 comes to abut on the face 9c of the stop lever 9 and the film cartridge 1 never moves back downward and is kept in a loaded position as shown in FIG. 3. In this state, since the face 1B of the film cartridge 1 is located more inward than the surface of the cover 25, the camera operator finds that the film cartridge loading action is finished and naturally acts to close the cartridge chamber lid 15.

Figure 4:
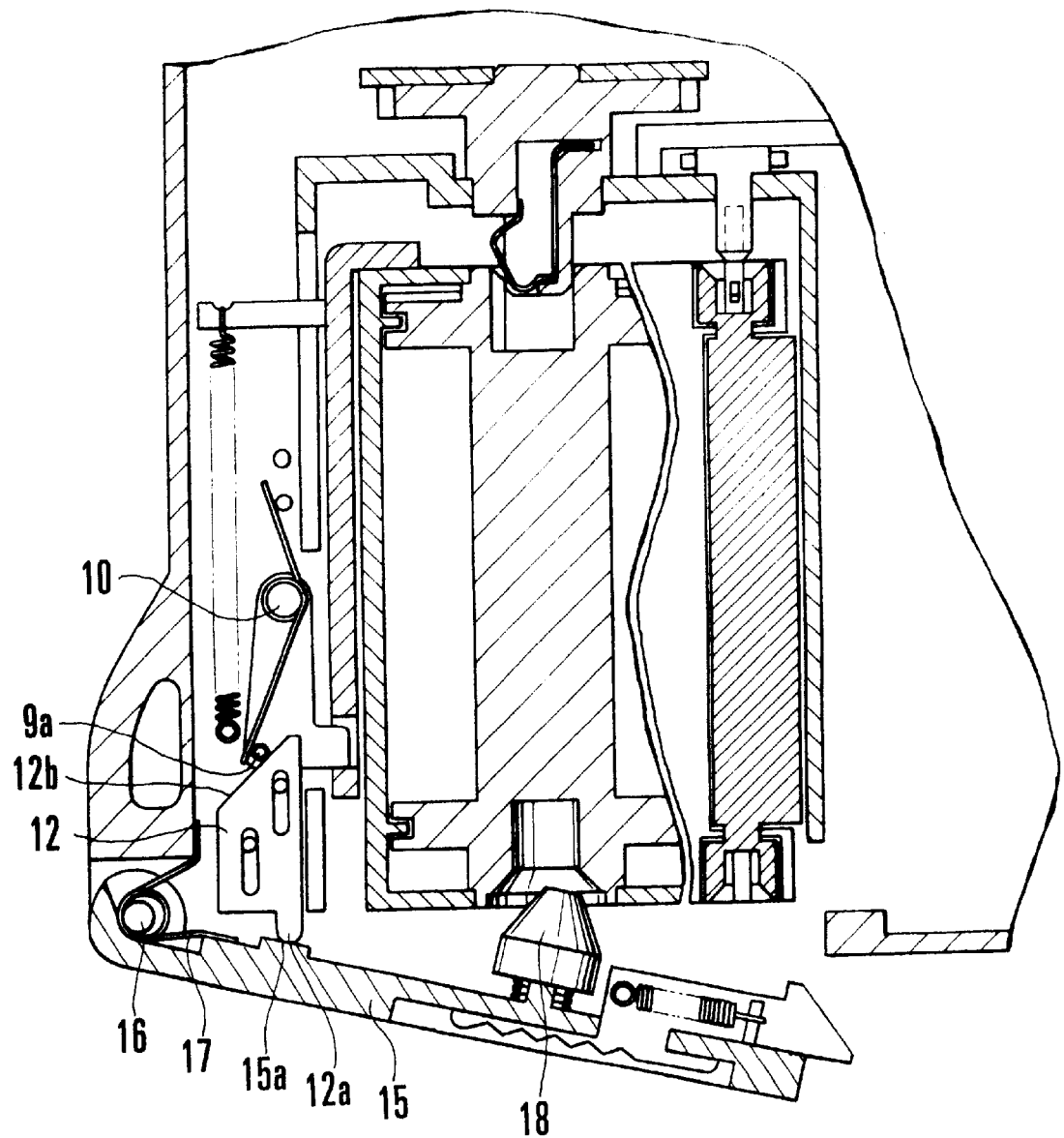
FIG. 4 is a vertical sectional view showing the camera in a state obtained when a cartridge chamber lid begins to be closed from its position shown in FIG. 3.

FIG. 4 shows the camera in a state obtained when the cartridge chamber lid 15 is in process of closing against the force of the spring 17. At this point of process shown, the R projection 12a of the cam plate 12 begins to abut on a pushing-up face 15a of the cartridge chamber lid 15. When the cartridge chamber lid 15 is closed further, the state of FIG. 4 changes to a state which is shown in FIG. 5. As shown in FIG. 5, the stop lever 9 is swung clockwise on the shaft 11 against the force of the spring 10 with the R projection 12a of the cam plate 12 pushed up by the pushing-up face 15a of the cartridge chamber lid 15 and the pin 9a of the stop lever 9, in turn, pushed by the cam face 12b. The hook part 9e of the stop lever 9 thus comes to completely pull out from the hole 5f of the eject lever 5. Then, the eject lever 5 which has been prevented from moving upward is allowed to move upward by the pulling-out of the stop lever 9 which is one of component elements of a restricting means. At the same time, a tapered face 18a of the cartridge pushing member 18 which is provided on the cartridge chamber lid 15 comes to abut on a pushing-up part 1ab of the take-up spool 1a of the film cartridge 1. Therefore, the film cartridge 1 comes to be pushed upward against the force of the spring 6 which is arranged for the eject lever 5 to move the film cartridge 1 downward. Further, the slanting face 19a of the lid opening-and-closing knob 19 abuts on the cover 25 to cause the knob 19 to move to the left against the force of the spring 20. In the state in which the cartridge chamber lid 15 is completely closed as shown in FIG. 6, the slanting face 19a overrides a protruding part 25b of the cover 25. After that, the lid opening-and-closing knob 19 is caused by the urging force of the spring 20 to move again to the right. As a result, the lock claw face 19c comes in over the upper side of the protruding part 25b of the cover 25 to finish a locking action on the cartridge chamber lid 15.

Figure 20:
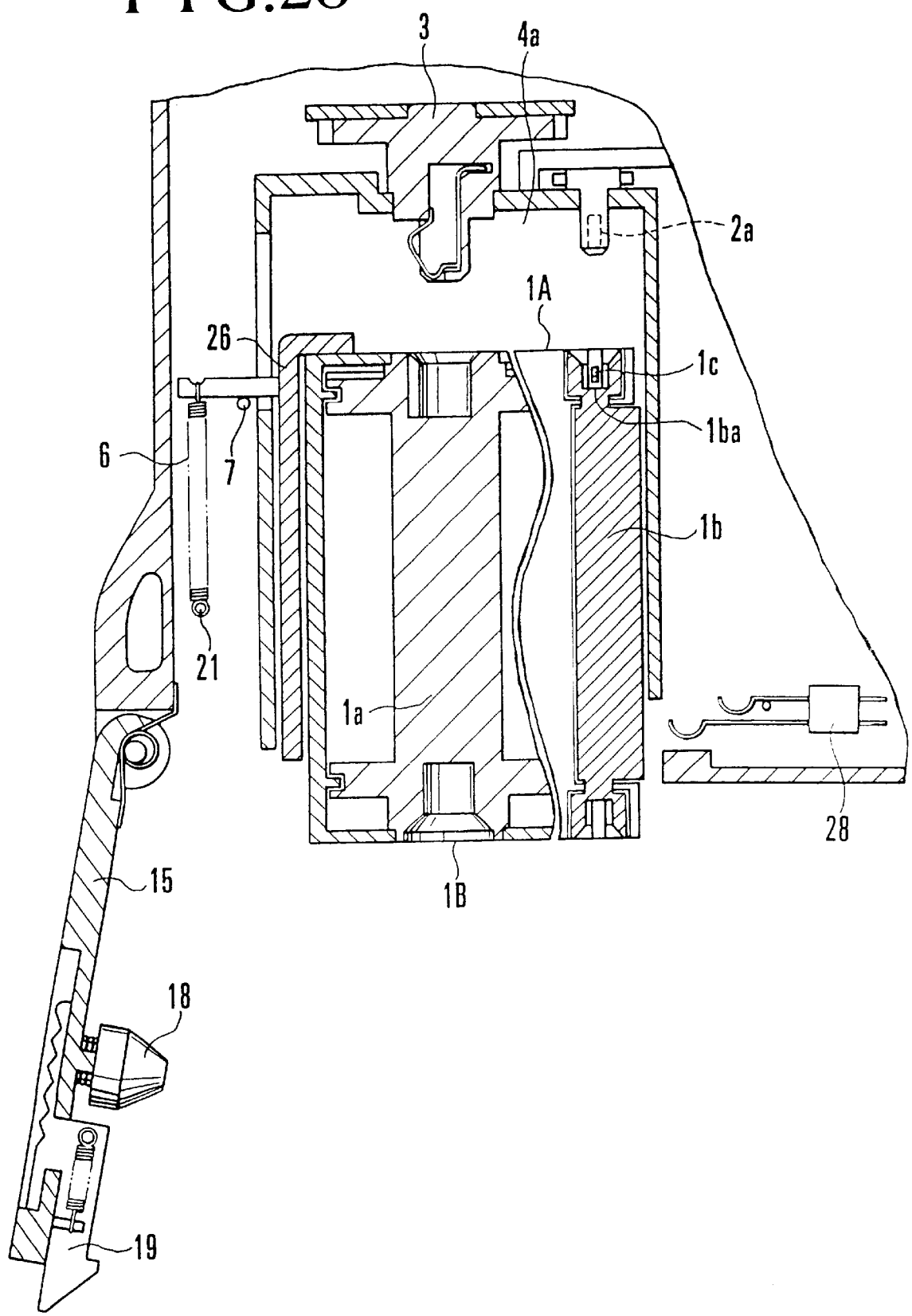
FIG. 20 is a vertical sectional view showing a cartridge chamber and parts around it of a camera which is arranged as a fourth embodiment of this invention.
Figure 21:
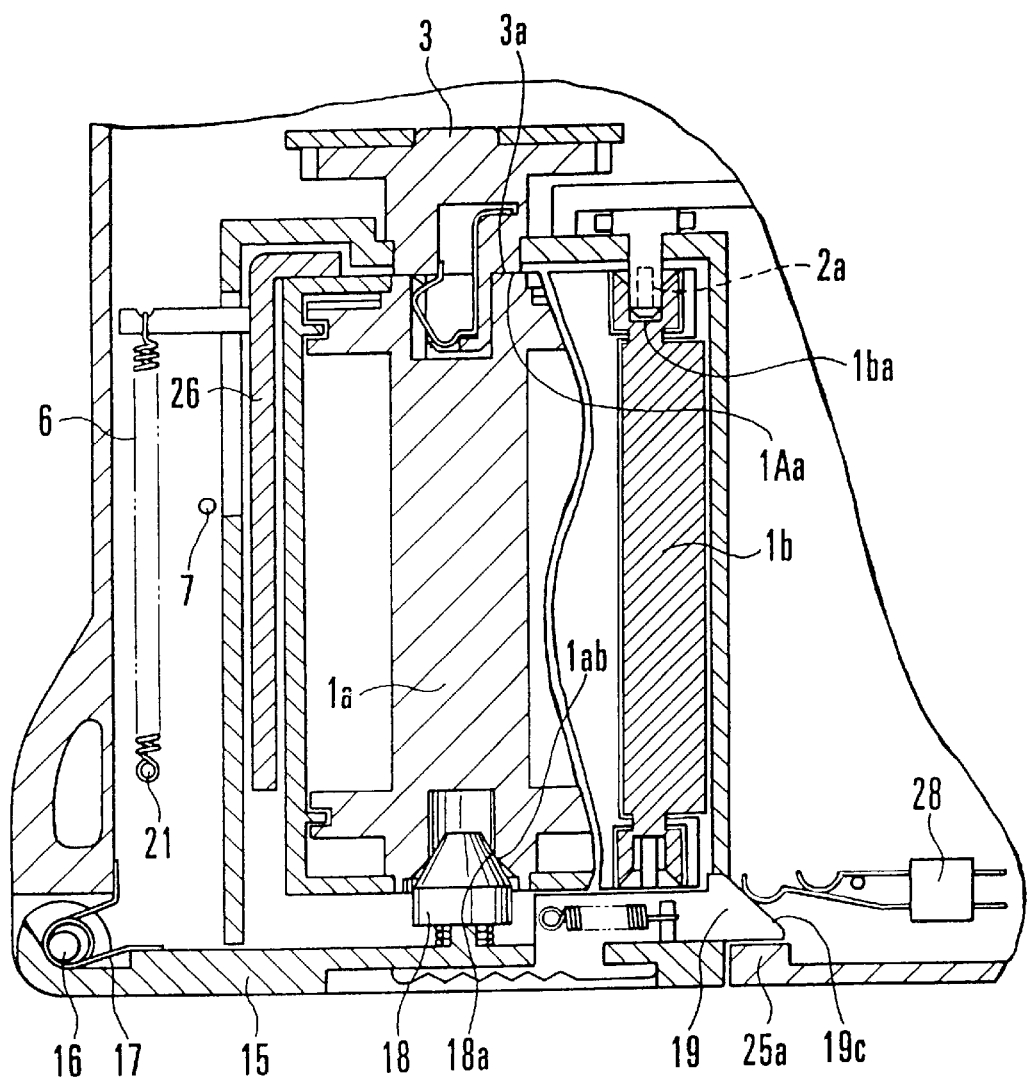
FIG. 21 is a vertical sectional view showing the camera in a state obtained when a cartridge chamber lid comes to be completely locked from the state of FIG. 20.

Referring to FIG. 6, upon completion of locking the cartridge chamber lid 15, the cartridge pushing member 18 which is provided on the cartridge chamber lid 15 comes to push up the take-up spool 1a of the film cartridge 1 to cause the datum abutting face 1Aa which is provided for the take-up shaft 3b to abut on the datum face 3a of the fork gear 3 and also to cause the engaging part 1ba of the ALL 1b to engage the engaging part 2a of the driving member 2. Further, with closing of the cartridge chamber lid 15 finished, the R projection 12a of the cam plate 12 is further pushed up by the pushing-up face 15a of the cartridge chamber lid 15. As a result, the pin 9a of the stop lever 9 is further pushed by the cam face 12b to have the stop lever 9 to be swung further clockwise. The film cartridge 1 is loaded completely in the state of FIG. 6. Then, the provision of, for example, a cartridge chamber lid opening-and-closing completion switch 28 or the like arranged, as shown in FIGS. 20 and 21, to output an ON signal in this state enables the camera to proceed with a sequence of actions as follows: The driving member 2 which has engaged the ALL 1b is driven by means of a motor or the like to shift the ALL 1b from a closed state to an open state (to permit a film to be sent out).

Further, the camera is arranged such that, in the states shown in FIGS. 1 to 3, the stop lever 9 which serves as a restricting member prevents the film cartridge 1 from being pushed in more than a predetermined extent. The predetermined extent is set at an amount within which the engaging part 1ba of the ALL 1b does not engage the engaging part 2a of the driving member 2. Therefore, even if the camera operator leaves the film cartridge 1 in the pushed-in state without closing the cartridge chamber lid 15, the engaging part 1ba of the ALL 1b never comes to engage the engaging part 2a of the driving member 2.

If the engaging part 1ba of the ALL 1b is left in a state of engaging the engaging part 2a of the driving member 2, there arises a problem which is as follows:

FIGS. 8 to 10 show a relation between the ALL 1b and the lock member 1c provided for the ALL 1b. The ALL 1b is provided with the engaging part 1ba and a groove 1baa. The groove 1baa is arranged to have a projection 2c of the engaging part 2a of the driving member 2, shown in FIG. 11, enter there to transmit the rotation of the driving member 2 to the ALL 1b. In the states shown in FIGS. 1 to 5, a fore end 1ca of the lock member 1c is inserted in the groove 1baa. When the projection 2c of the driving member 2 is pushed into the groove 1baa from a front side of the paper of FIG. 8, the fore end 1ca of the lock member 1c is caused to turn counterclockwise (in the direction of arrow) on its mount part 1cc. However, in the state of FIG. 8, the fore end 1ca of the lock member 1c is in the groove 1baa of the engaging part 1ba of the ALL 1b and, therefore, the ALL 1b cannot be opened by turning the ALL 1b in this state. When the engaging part 2a of the driving member 2 is inserted into the engaging part 1ba of the ALL 1b from the front side of the paper of the drawing in the state of FIG. 8, the projection 2c of the driving member 2 enters the groove 1baa to cause the lock member 1c to warp and turn on the mount part 1cc as mentioned above, because the fore end 1ca of the lock member 1c is in a slanting shape. As a result, the state of FIG. 8 changes to a state as shown in FIG. 9. (The driving member 2 is omitted from FIG. 9 for the sake of a clearer illustration). Therefore, since the lock member 1c is brought into an unlocked state simply by resilient deformation, leaving the camera in the state of FIG. 9 would cause creeping at the mount part 1cc, an arm part 1cb, etc., or a plastic deformation or a crack at the mount part 1cc. In the event of such trouble, the state of FIG. 9 would remain unchanged even after the driving member 2 is pulled out. Then, locking by the ALL 1b would become imperfect or impossible. Under such a condition, the ALL 1b would be left open after the film cartridge 1 is taken out to expose to light the film contained in the film cartridge 1.

Therefore, when the state of FIG. 9 is obtained with the engaging part 2a of the driving member 2 inserted into the engaging part 1b of the ALL 1b, the state must be immediately changed either to open the ALL 1b as shown in FIG. 10 or to pull out the driving member 2 as shown in FIG. 8. When the engaging part 2a of the driving member 2 is inserted into the engaging part 1ba of the ALL 1b, the ALL 1b becomes rotatable as the lock member 1c moves away as shown in FIG. 10. Under this condition, when the ALL 1b is caused to rotate clockwise by the power of the camera, the fore end 1ca of the lock member 1c comes into a recessed part 1bac which is provided in a opening completion position, so that the lock member 1c can be set free from any stress in the same manner as in the locking position shown in FIG. 8. Therefore, the deformation and the crack mentioned above never take place.

Further, the closing action on the cartridge chamber lid 15 shown in FIGS. 4 to 6 normally does not require a long period of time. Therefore, even if the camera operator stops the cartridge chamber lid closing action before the lid opening-and-closing knob 19 comes to be locked, the instant the cartridge chamber lid 15 is moved in the direction of opening by the spring 17, the spring 6 for the eject lever 5 causes the film cartridge 1 to be ejected to a position where the engaging part 1ba of the ALL 1b never engages the engaging part 2a of the driving member 2. Therefore, there arises no problem.

In taking out the film cartridge 1, when the lid opening-and-closing knob 19 is caused to slide to the left from its position shown in FIG. 6, the provision of, for example, a cartridge lid opening-and-closing switch 28 which is as shown in FIGS. 20 and 21 or something like it enables the ALL 1b to be shifted from its open state shown in FIG. 10 to a closed state as shown in FIG. 9 by rotating the driving member 2 according to a change taking place in the state of the switch 28, as the switch 28 then changes from an on-state to an off-state.

Next, when the cartridge chamber lid 15 is unlocked, the spring 17 causes the cartridge chamber lid 15 to swing clockwise on the shaft 16. Then, since the cartridge pushing member 18 ceases to push up the take-up spool 1a of the film cartridge 1, the spring 6 causes the eject lever 5 to move downward to eject the film cartridge 1 to bring about the state shown in FIG. 1.

In this instance, since the lock member 9 is urged by the spring 10 to swing counterclockwise on the shaft 11, the pushing face 15a ceases to push the projection 12a of the cam plate 12 when the cartridge chamber lid 15 opens. Therefore, the cam plate 12 moves downward. The hook part 9e of the lock member 9 then tries to enter the hole 5f of the eject lever 5. However, since the cam plate 12 is arranged to move with its cam face 12b pushed by the pin 9a, there arises some time lag. The motion of the eject lever 5 thus takes place earlier than the swing of the stop lever 9 to permit a shift from the state of FIG. 6 to the state of FIG. 1. The action of obtaining an ejected state is thus finished. In the ejected state shown in FIG. 1, the engaging part 1ba of the ALL 1b is of course not engaging the engaging part 2a of the driving member 2.

FIGS. 12 to 15 show a camera which is a second embodiment of this invention in varied states obtained in loading the camera with the film cartridge. In these drawings, the same parts as those of the first embodiment are indicated respectively by the same reference numerals.

The second embodiment differs from the first embodiment in that the eject lever 5 is replaced with an eject lever 22, which does not have the hole part 5f which is provided in the eject lever 5 of the first embodiment.

Figure 12:
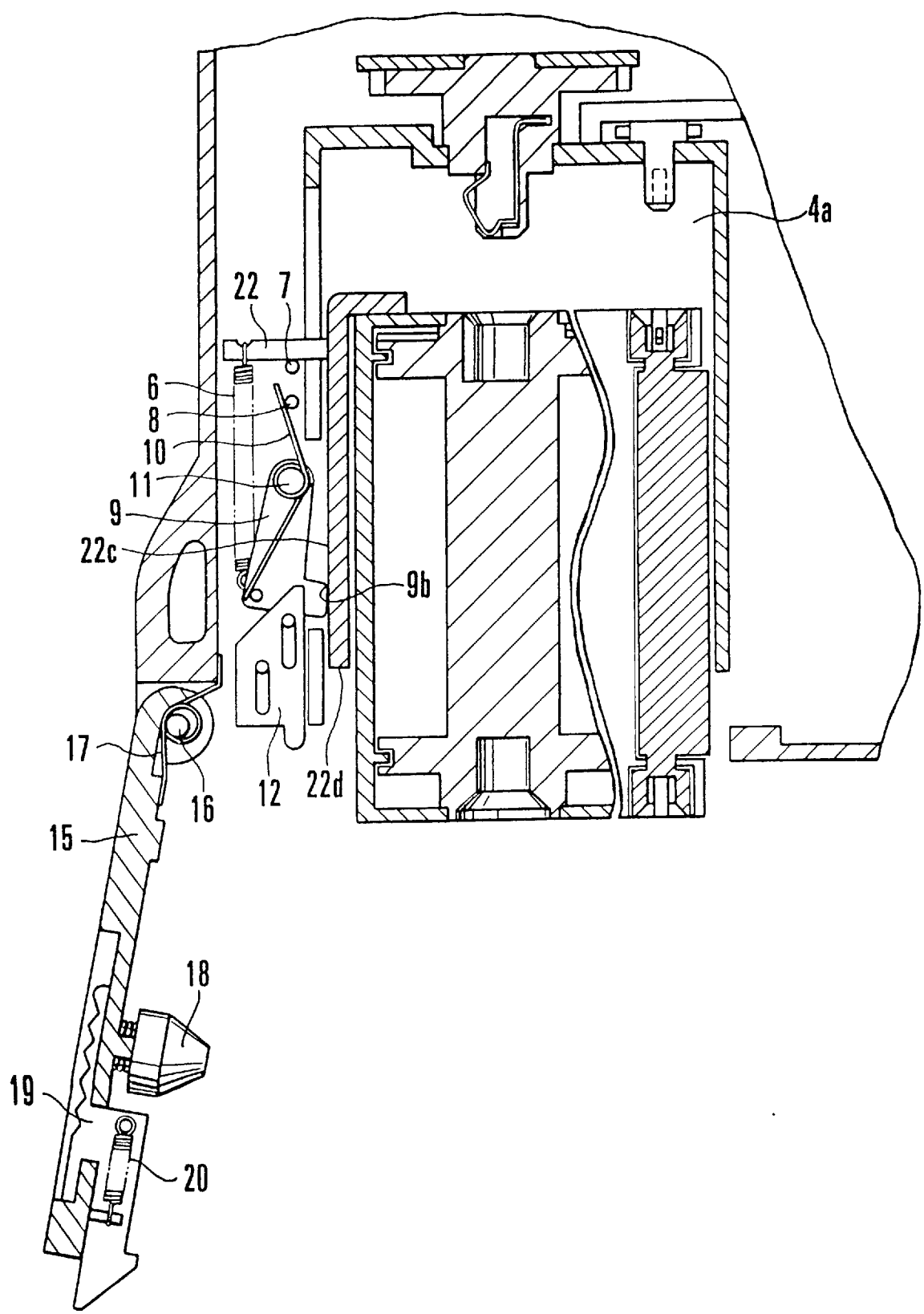
FIG. 12 is a vertical sectional view showing a cartridge chamber and parts around it of a camera which is arranged as a second embodiment of this invention.
Figure 13:
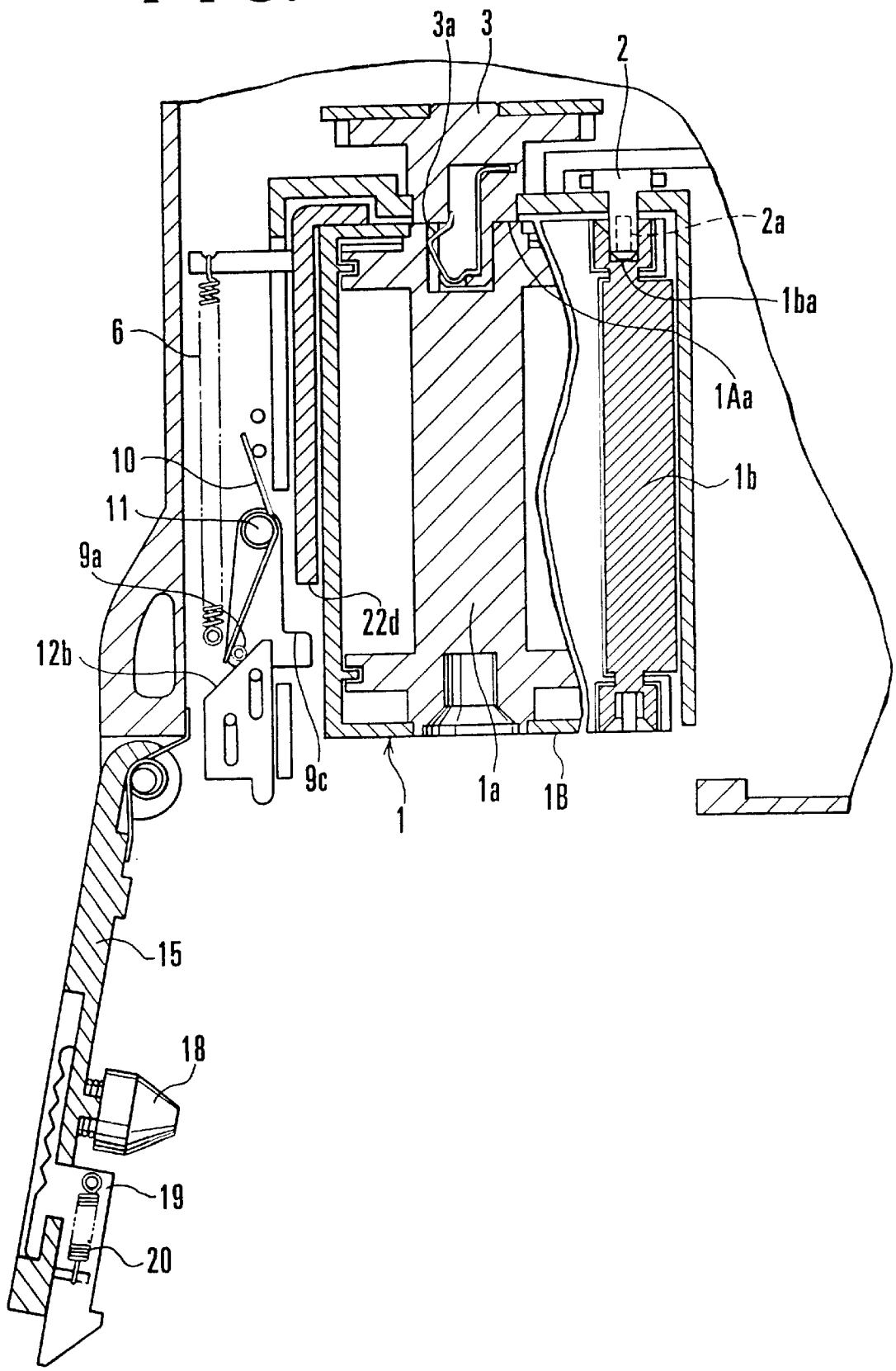
FIG. 13 is a vertical sectional view showing the same camera in a state obtained when a film cartridge is pushed in from its position shown in FIG. 12.
Figure 14:
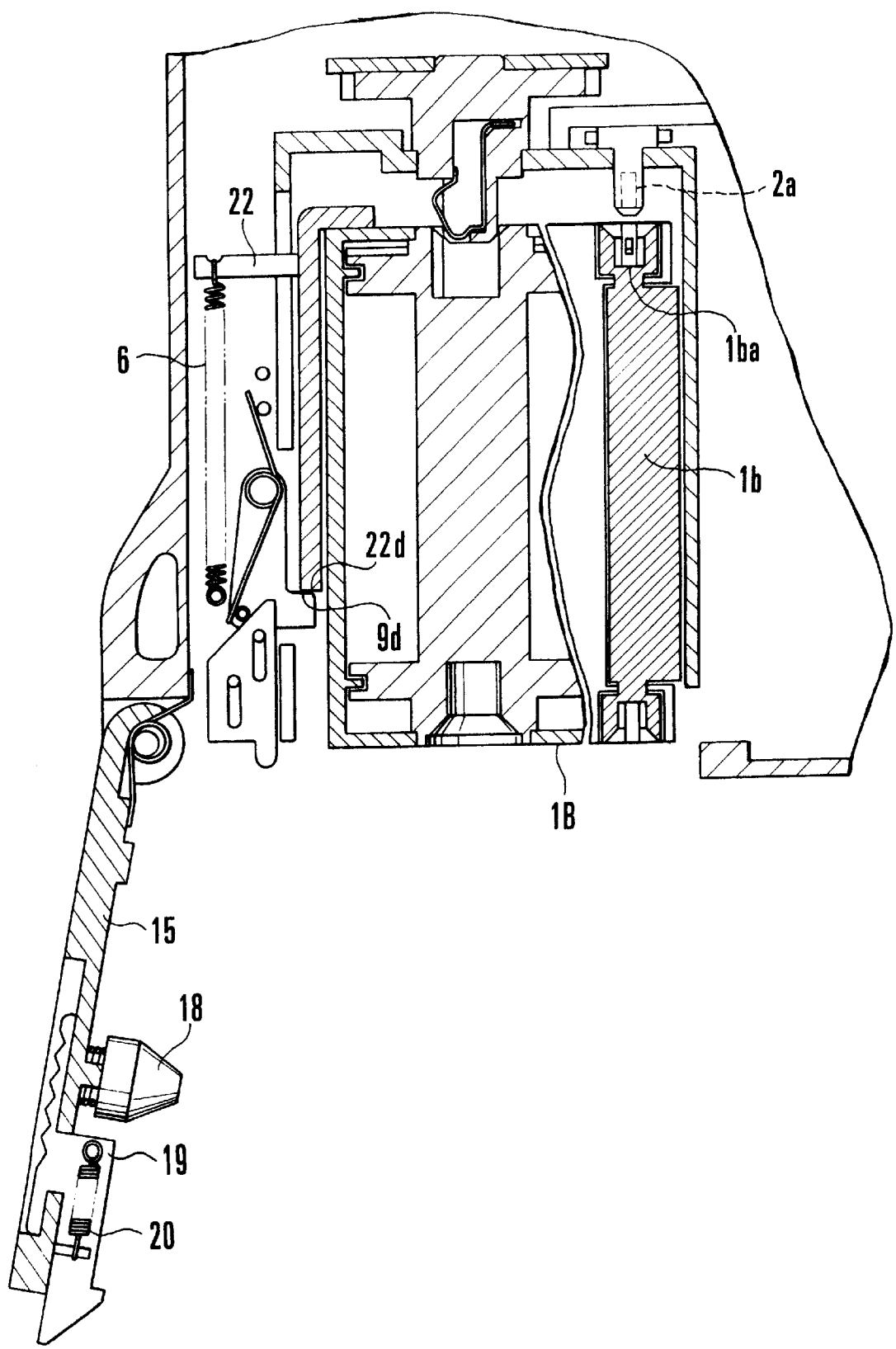
FIG. 14 is a vertical sectional view showing the same camera in a state obtained when the film cartridge is released from pushing pressure in the state of FIG. 13.

FIG. 12 shows the camera in a state obtained at the commencement of loading the camera with the film cartridge by opening the cartridge chamber lid 15. FIG. 13 shows the camera in a state obtained when the face 1B of the film cartridge 1 is further pushed in. Since the eject lever 22 which has the R part 9b of the stop lever 9 abutting on its side face 22c in the state of FIG. 12 is pushed when the film cartridge 1 is pushed, the stop lever 9 is set in a stop position by the spring 10 in the state of FIG. 13. Further, unlike the first embodiment, the eject lever 22 has no stop position set for a pushing-in action on the the eject lever 22. Therefore, the eject lever 22 can be pushed in until the abutting face 1A of the film cartridge 1 abuts on the datum face 3a of the fork gear 3. Besides, the engaging part 1ba of the ALL 1b is in a state of engaging the engaging part 2a of the driving member 2. In the event of a state obtained by pushing the face 1B with a finger or the like, however, the spring 6 moves the eject lever 22 back as shown in FIG. 14 when the finger or the like detaches from the face 1B. The eject lever 22 then comes to a stop with its end face 22d coming to abut on a face 9d of the stop lever 9. As apparent from FIG. 14, the engaging part 1ba of the ALL 1b does not engage the engaging part 2a of the driving member 2 in this state. The lock member 1c of the ALL 1b thus can be protected even if it is left in the state of FIG. 14.

Figure 15:
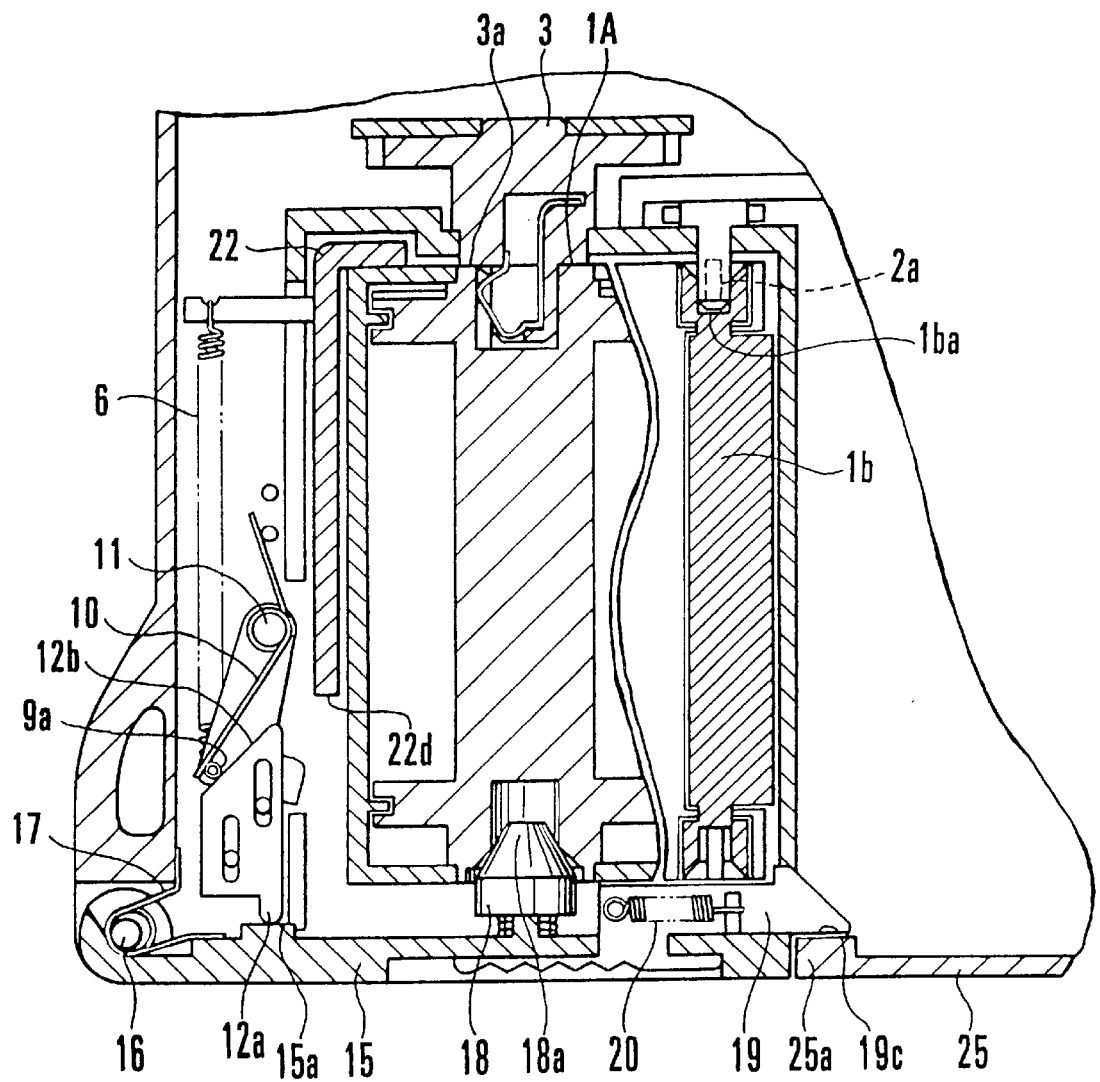
FIG. 15 is a vertical sectional view showing the camera in a state obtained when a cartridge chamber lid comes to be completely locked from the state of FIG. 14.

After that, the cartridge chamber lid 15 is closed to finish the film cartridge loading action as shown in FIG. 15 in the same manner as in the case of the first embodiment. In ejecting the film cartridge 1 after completion of photographing, the camera of course can be brought into the state of FIG. 12 like in the case of the first embodiment.

FIGS. 16 to 19 show a camera which is a third embodiment of this invention in varied states obtained in loading the camera with the film cartridge. In these drawings, the same parts as those of the first and second embodiments are indicated by the same reference numerals.

In the third embodiment, the stop lever 9 of the second embodiment is replaced with a stop lever 24. In the case of the first and second embodiments, the eject lever 5 or 22 is alone hooked on the stop lever 9 at the time of loading, and the film cartridge 1 thus can be taken out even in process of loading by just letting it drop down. On the other hand, in the third embodiment, the stop lever 24 is arranged to directly hook the cartridge 1 in loading the camera with the film cartridge 1.

Figure 16:
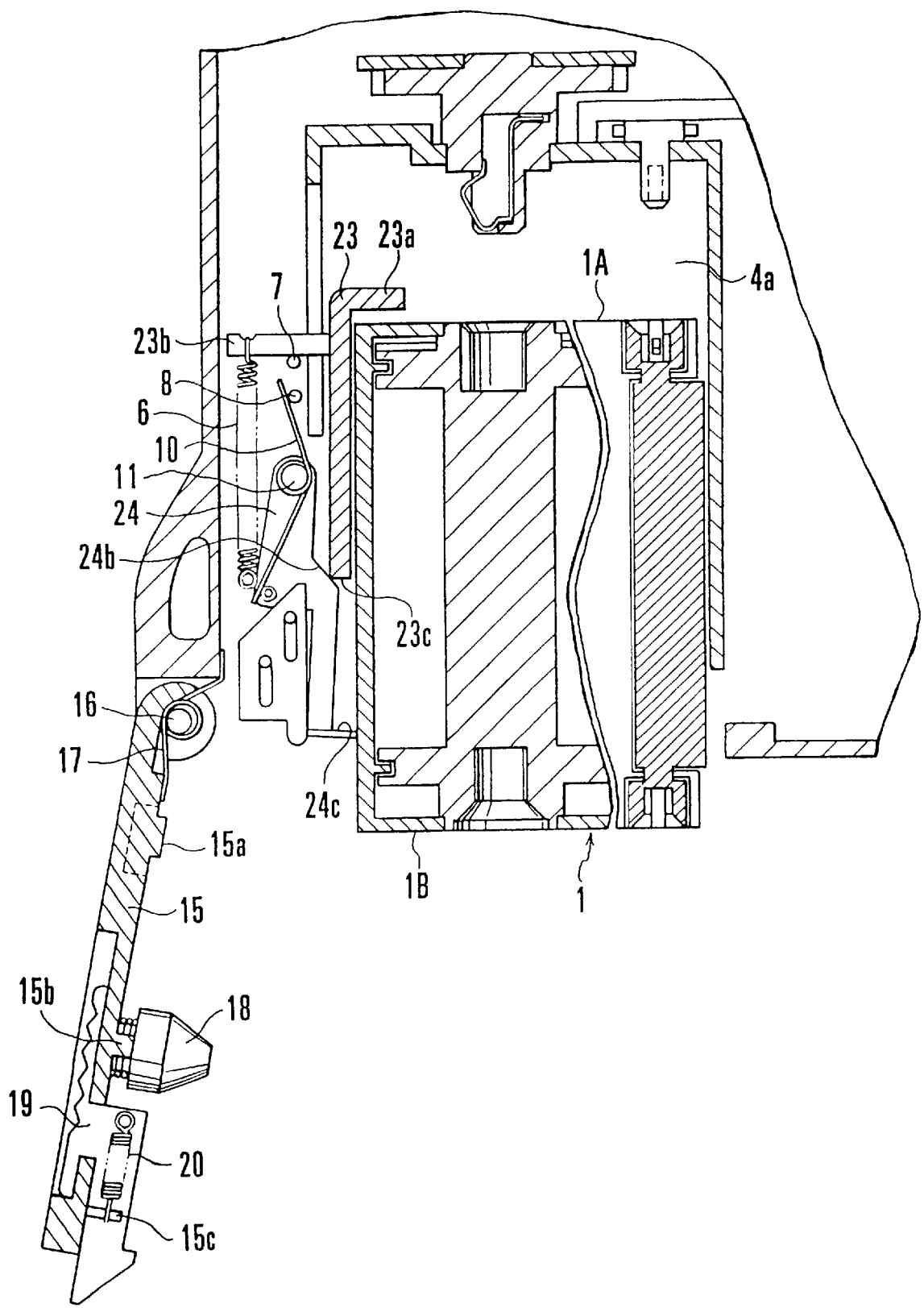
FIG. 16 is a vertical sectional view showing a cartridge chamber and parts around it of a camera which is arranged as a third embodiment of this invention.

Referring to FIG. 16, when the cartridge chamber lid 15 is opened, an eject lever 23 is caused to move downward by the spring 6 and comes to a stop at a stopper pin 7. In this state, an end face 23c of the eject lever 23 abuts on a slanting face 24b of the stop lever 24 to have a film cartridge hooking part 24c of the stop lever 24 in a state of being retracted from the film cartridge 1 by swinging the stop lever 24 clockwise on the shaft 11 of the body against the force of a spring 10.

Figure 17:
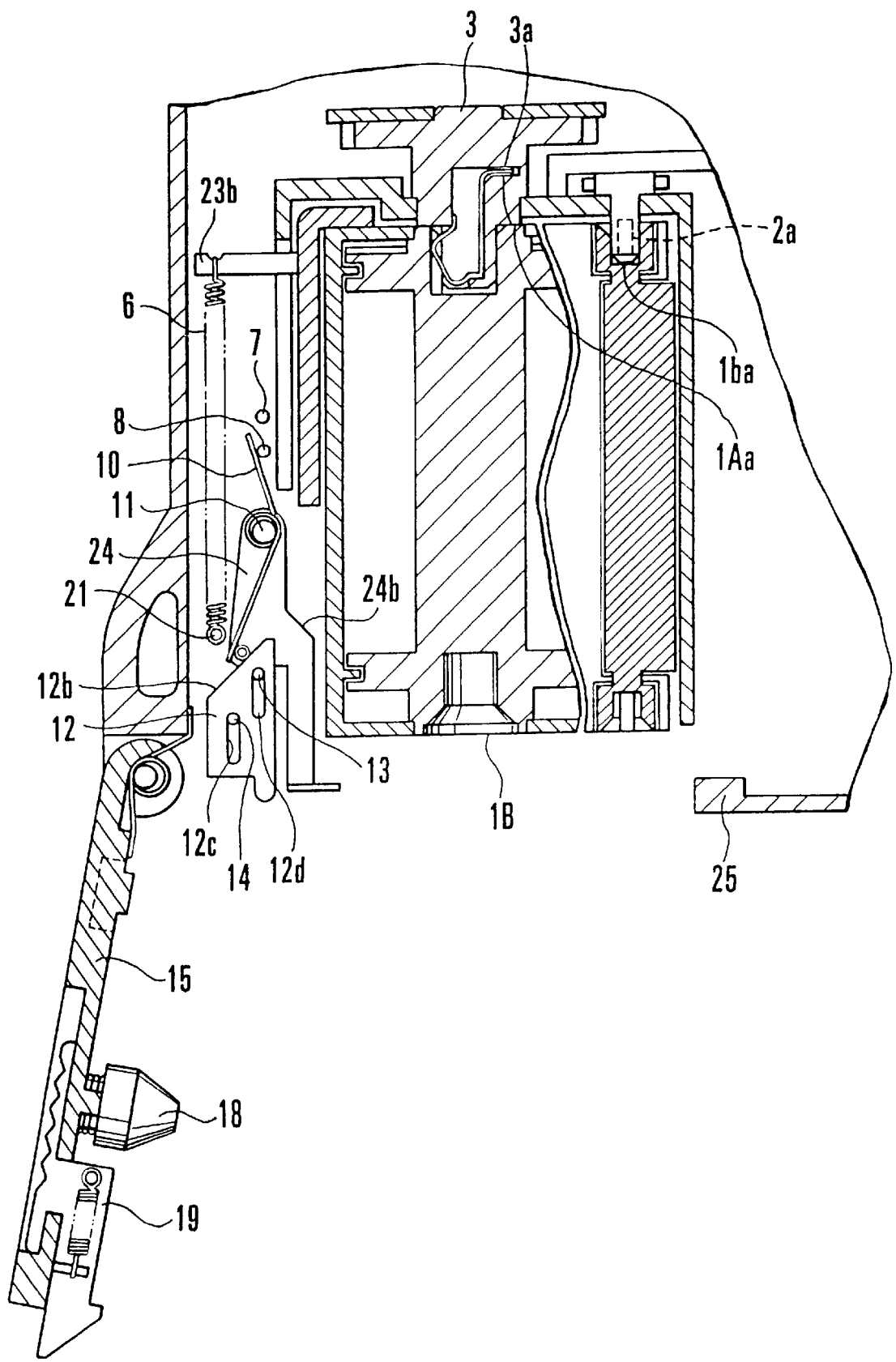
FIG. 17 is a vertical sectional view showing the same camera in a state obtained when a film cartridge is pushed in from its position shown in FIG. 16.
Figure 18:
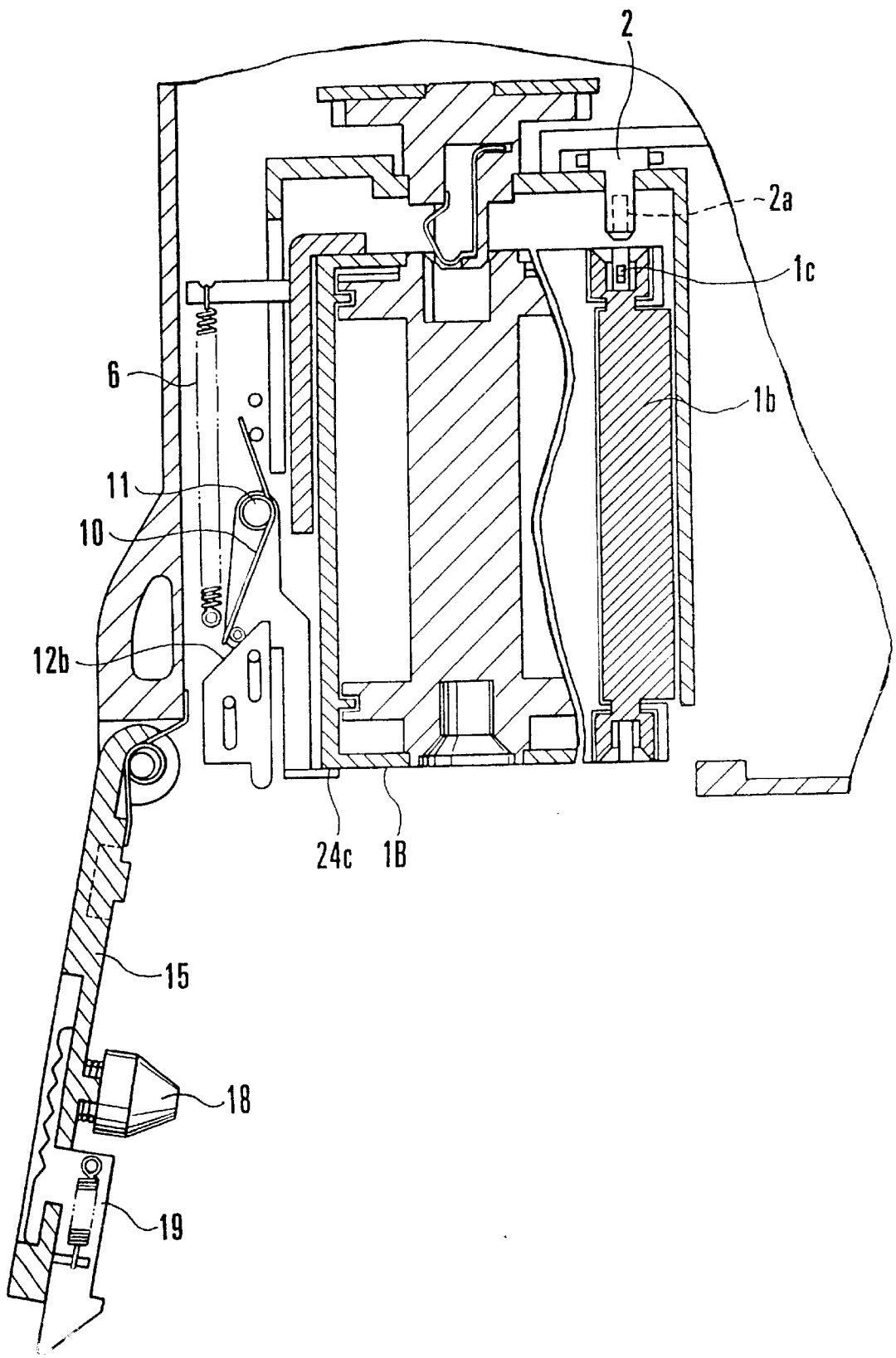
FIG. 18 is a vertical sectional view showing the same camera in a state obtained when the film cartridge is released from pushing pressure in the state of FIG. 17.
Figure 19:
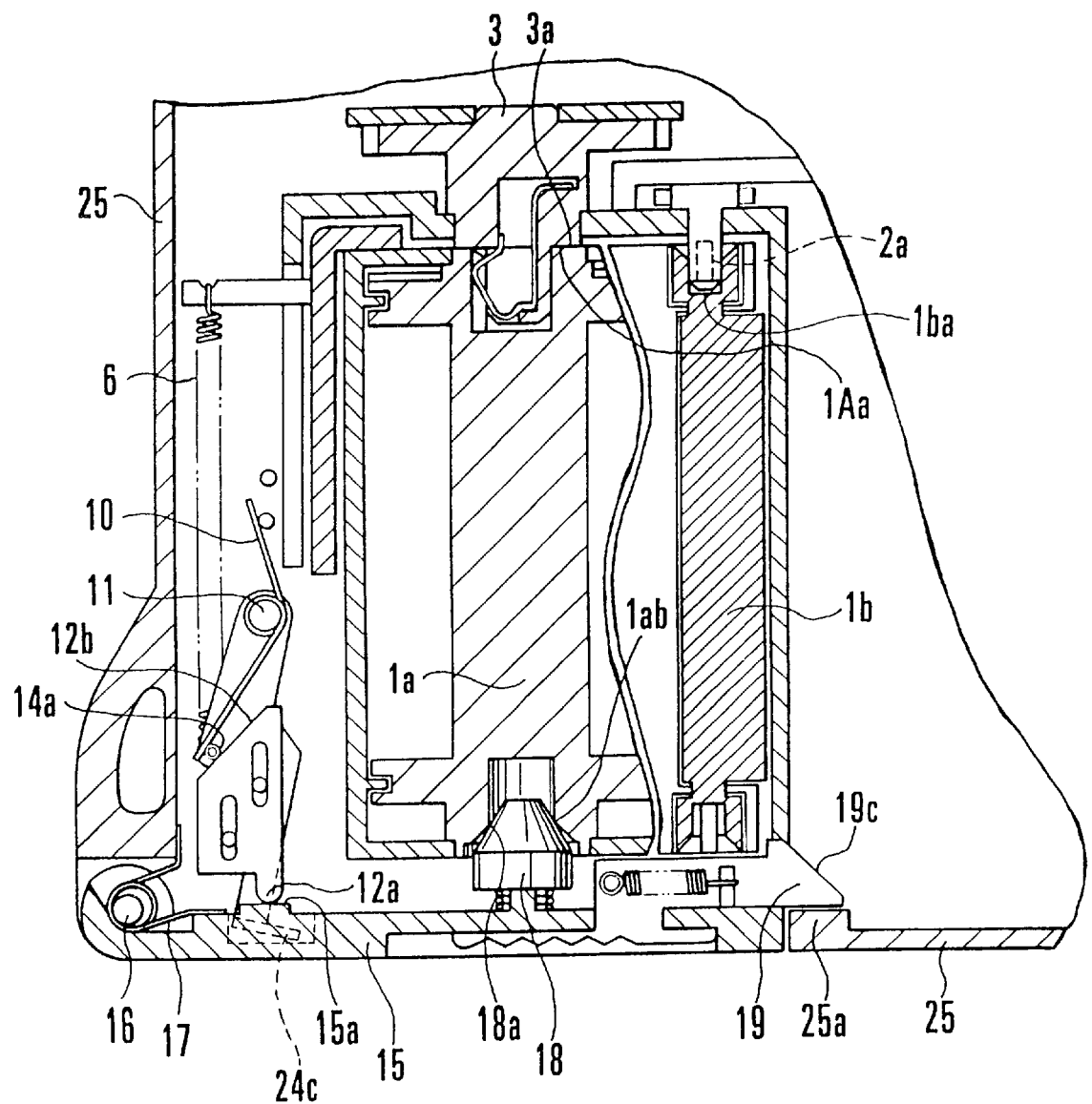
FIG. 19 is a vertical sectional view showing the camera in a state obtained when a cartridge chamber lid comes to be completely locked from the state of FIG. 18.

When the film cartridge 1 is pushed in with a finger or the like further from the state of FIG. 16, the pushing-in action comes to an end with the abutting face 1A of the film cartridge 1 coming to abut on the datum face 3a of the fork gear 3 as shown in FIG. 17. When the pushing finger detaches, the film cartridge 1 moves back to a position where the film cartridge 1 is hooked by the hooking part 24c of the stop lever 24 as shown in FIG. 18. In this position, the film cartridge 1 is kept in a loaded state by the stop lever 24, and the ALL 1b is not engaging the driving member 2. Therefore, like in the cases of the first and second embodiments, the lock member 1c of the ALL 1b would never be damaged even if the camera is left in the state of FIG. 18. Further, the cartridge chamber lid 15 is closed to complete film cartridge loading, as shown in FIG. 19. The camera proceeds with a sequence of actions, and, after completion of photographing, the cartridge chamber lid 15 is opened and the film cartridge 1 is moved to its ejected position, i.e., is reset in the state of FIG. 16, in the same manner as in the cases of the first and second embodiments.

FIGS. 20 and 21 show a camera which is a fourth embodiment of this invention in states obtained in loading the camera with the film cartridge. In these drawings, the same parts as those of the first to third embodiments are indicated by the same reference numerals.

In the fourth embodiment, the stop levers of the first, second and third embodiments are omitted and the eject lever is used alone.

Referring to FIG. 20, the cartridge chamber lid 15 is opened and the face 1B of the film cartridge 1 is pushed into the cartridge chamber 4a to load the camera with the film cartridge 1 in the same manner as mentioned in the foregoing. In this case, since the embodiment is provided with no stop lever, the stopper pin 7 is set in such a position that, when a pushing finger detaches after pushing, the film cartridge 1 is moved back to the state of FIG. 20 by the spring 6 which is provided for an eject lever 26, so that the film cartridge 1 always can be moved back to a position where the engaging part 1ba of the ALL 1b never engages the engaging part 2a of the driving member 2. Therefore, even if the camera is left in the state of having the cartridge chamber lid 15 left open as shown in FIG. 20, the lock member 1c of the ALL 1b can be protected in the same manner as in the cases of the first to third embodiments.

Further, when the cartridge chamber lid 15 is closed, the film cartridge 1 is pushed by the cartridge pushing member 18 to a loading completed position as shown in FIG. 21. A lid opening-and-closing detecting switch 28 then turns on. Upon detection of the on-state of the switch 28, the driving member 2 is rotated to bring the ALL 1b into an open state, so that the lock member 1c can be prevented from being deformed or damaged, as described in the foregoing with reference to FIG. 10 and in the same manner as the first to third embodiments.

Figure 22:
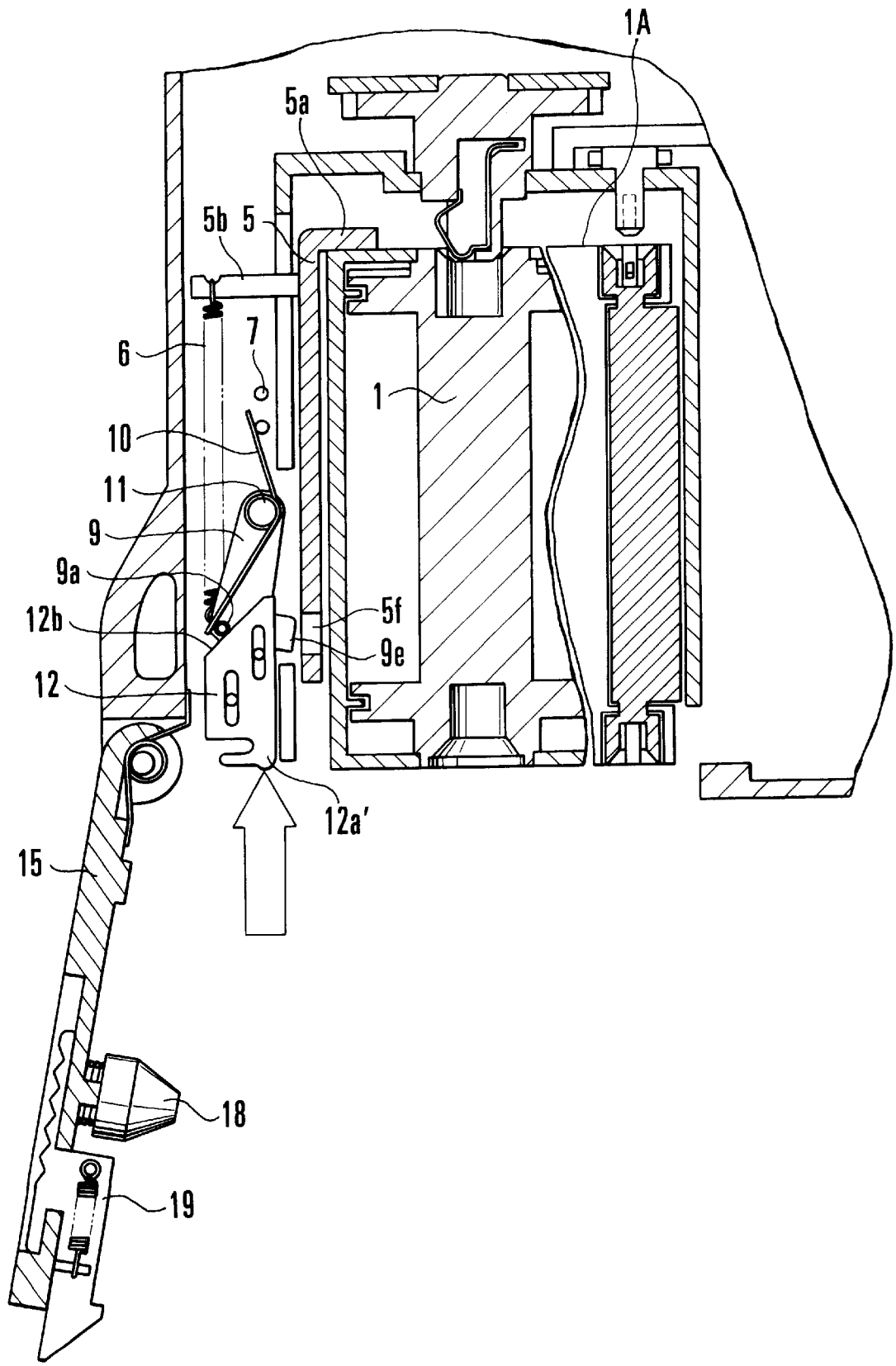
FIG. 22 is a vertical sectional view showing a cartridge chamber and parts around it of a camera which is arranged as a fifth embodiment of this invention.
Figure 23:
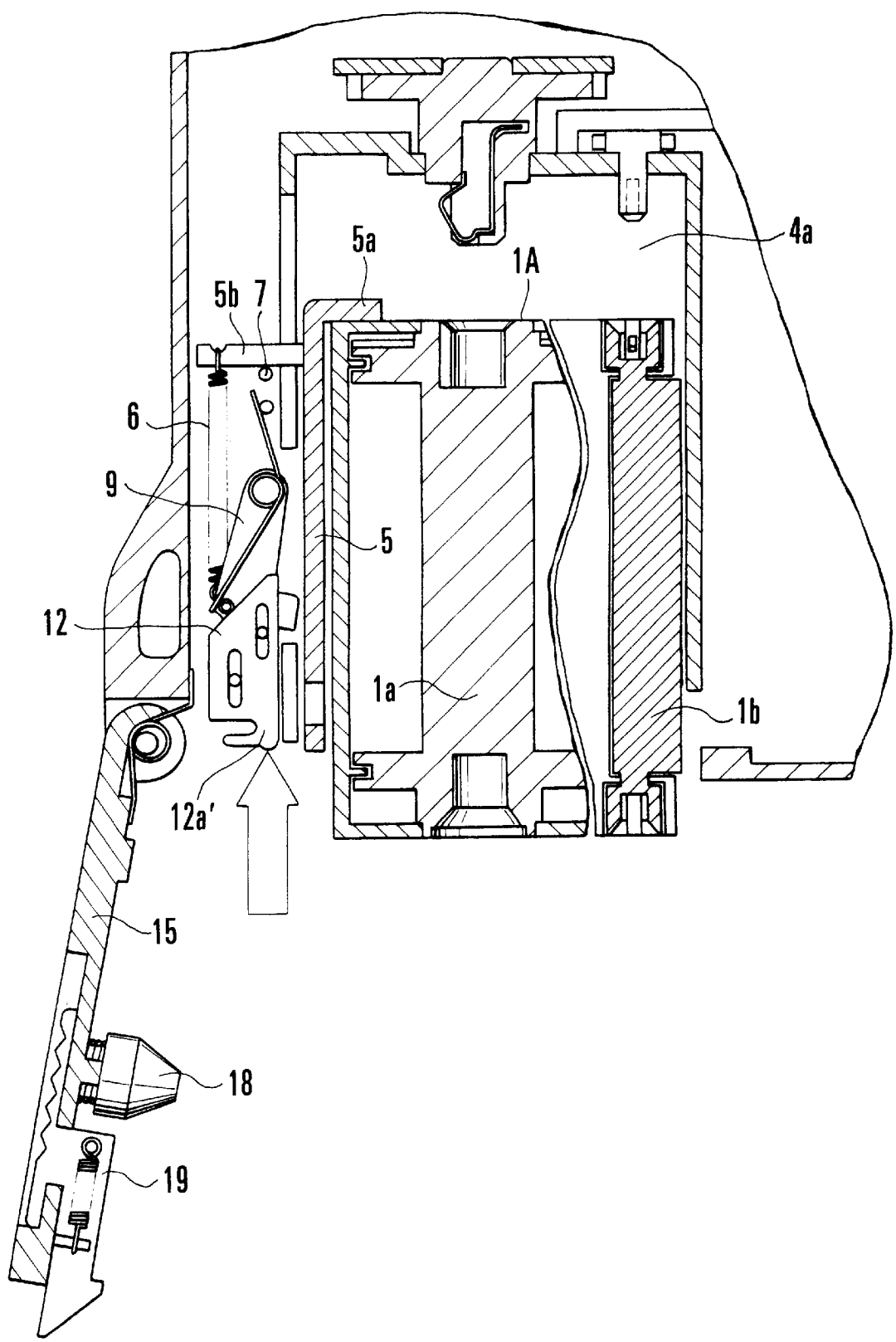
FIG. 23 is a vertical view showing the camera in a state obtained under an operation performed to take out a film cartridge from its position shown in FIG. 22.

FIGS. 22 and 23 show a camera which is a fifth embodiment of this invention in states obtained in loading the camera with the film cartridge. In these drawings, the same parts as those of the first to fourth embodiments are indicated by the same reference numerals.

While the film cartridge loading state of the first embodiment obtained with the cartridge chamber lid 15 opened is as shown in FIG. 3, in the case of the fifth embodiment, the R part 12a of the cam plate 12 of the first embodiment is changed to an R part 12a' which is shaped to be operable with a finger. FIGS. 22 and 23 show the R part 12a' as being pushed in the direction of arrow.

As apparent from FIG. 22, when the R part 12a' of the cam plate 12 is pushed in the direction of arrow with the camera loaded with the film cartridge 1, the slanting face 12b of the cam plate 12 pushes the pin 9a of the stop lever 9. This causes the stop lever 9 to swing clockwise on the pin 11 of the camera body against the force of the spring 10. The hook part 9e of the stop lever 9 which has locked the eject lever 5 by engaging its hole 5f then detaches from the hole 5f to make the eject lever 5 movable downward. When the R part 12a' of the cam plate 12 is further pushed with a finger or the like, the eject lever 5 moves downward and comes to a stop with the arm part 5b coming to abut on the stopper pin 7. At the same time, the hook part 5a pushes down the face 1A of the film cartridge 1. The film cartridge 1, therefore, also moves downward to the same extent as the movement of the eject lever 5 to be reset in its eject position.

Therefore, when the camera happens to be loaded with a wrong film cartridge by mistake, the wrong film cartridge can be reset in the eject position by simply pushing the R face 12a' of the cam plate 12 and film taken out to be replaced with a correct film cartridge without repeatedly opening and closing the cartridge chamber lid 15. The arrangement not only permits quick reloading to secure a valuable shutter operating opportunity but also effectively saves electric energy from being wasted for useless execution of a sequence of actions resulting from closing of the cartridge chamber lid 15.

According to the arrangement of each of the embodiments described, the camera is provided with a means for restricting the insertion of the film cartridge 1 to a predetermined extent. By virtue of the restricting means, the lock member 1c of the ALL 1b will never be broken nor deformed to result in an unstably locked state even if the film cartridge 1 is left in a loaded state while the cartridge chamber lid 15 is open.

Further, by arranging the camera to have the film cartridge 1 in a non-engaging position when the cartridge chamber lid 15 is in an open sate, the lock member 1c of the ALL 1b of the film cartridge 1 also can be prevented from being broken or deformed to cause an unstable locked state even if the camera is left loaded with the film cartridge 1 while the cartridge chamber lid 15 is in its open state.

Further, the camera is arranged to hold the film cartridge 1 always in an eject position when the cartridge chamber lid 15 is open by using the ejecting spring 6, the cam plate 12, etc. The eject position is arranged such that the ALL 1b of the film cartridge 1 never engages the engaging part of the driving member 2 of the camera. That arrangement also contributes to attainment of the above-stated advantage.

In the case of the fifth embodiment, the camera is provided with a resetting means for causing a film cartridge 1, when it is in a state of having been completely stowed within the camera body (including its outermost face 1B), to be reset in the eject position where the film cartridge 1 can be readily taken out without opening and closing the cartridge chamber lid 15. The resetting means thus permits reloading the camera with any desired film cartridge 1. The resetting means eliminates such an inconvenience that, if the cartridge chamber lid 15 is once closed, the camera normally performs useless actions such as opening and closing the ALL 1b, detection of the loaded state of the film cartridge 1 and film feeding and thus not only takes time before the film cartridge is again taken out but also wastes electric energy.

While each of the embodiments described is arranged to have the cartridge chamber lid to be manually opened and closed, this invention is applicable also to a case where the cartridge chamber lid is to be automatically opened and closed by a motor or the like.

This invention is not limited to the camera of the kind arranged to have a film cartridge inserted from below the camera body as in the cases of the embodiments described. This invention is applicable also to a camera arranged, for example, to have a film cartridge inserted from above or from one side of the camera body.

Further, this invention is not limited to the camera of the kind arranged to have a film cartridge axially inserted as in the cases of the embodiments described. This invention is applicable also to a camera arranged to have a film cartridge inserted perpendicularly to the axis of the film cartridge, for example, as disclosed in Japanese Laid-Open Utility Model Application No. SHO 52-102726. More specifically, in this case, an opening-and-closing lid of the prior art cited may be provided, in addition to a film spool carrying member, with a driving member arranged to engage a door opening-and-closing mechanism of a film take-out window. The opening-and-closing lid may be thus arranged to be held in its open position when a cartridge chamber lid which corresponds to a back lid is open, and then the driving member is prevented from engaging the door opening-and-closing mechanism when the cartridge chamber lid is open. In this case, when the cartridge chamber lid is closed, the opening-and-closing lid is of course arranged to be also closed and the driving member is arranged to come to engage the door opening-and-closing mechanism in response to closing of the cartridge chamber lid.

This invention applies also to an apparatus, or a camera, adapted to use a cartridge having a movable light-shield cover or the like of a shape which differs from the cartridge used by the embodiments described.

This invention applies also to an apparatus using an image recording medium other then a film.

This invention applied also to cartridges of any type other than the type of the cartridge used by the embodiments described, a cartridge containing an image recording medium other than a film, cartridges of other kinds, and a loading matter which is not a cartridge but is, for example, a battery or the like.

Further, this invention is applicable to a case where the embodiments or their technological elements are combined in any desired manner.

Further, this invention is applicable to a case where the whole or a part of the appended claims or the arrangement of the embodiments described form an apparatus or a device which is arranged to be coupled with some other device or to form a component of an apparatus.

This invention is applicable also to cameras of varied kinds including a single-lens reflex camera, a lens-shutter type camera, a video camera, to an optical apparatus or some other apparatus other than a camera or to component elements of such apparatuses.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus adapted for an image recording medium cartridge disposable in a cartridge chamber having a cover, and having a cartridge cover for opening and closing an opening part of the cartridge for passing an image recording medium therethrough, and an operation part for operating the cartridge cover, the apparatus comprising:
   a) a first device which engages and actuates the operation part of the cartridge; and
   b) a second device which prevents the operation part of the cartridge and said first device from engaging each other so long as the cover of the cartridge chamber is open.

2. An apparatus according to claim 1, wherein the image recording medium includes a film.

3. An apparatus according to claim 1, wherein the cartridge cover includes means for blocking light.

4. An apparatus according to claim 1, further comprising a canceling device that cancels an action of said second device in response to a closing action of the cover of the cartridge chamber.

5. An apparatus according to claim 1, further comprising a canceling device which cancels an action of said second device.

6. An apparatus according to claim 1, further comprising an operating device which causes the operation part to be actuated by said first device in response to a closing action of the cover of the cartridge chamber.

7. An apparatus according to claim 1, wherein said second device includes an elastic member.

8. An apparatus according to claim 1, wherein said second device includes means for urging the cartridge to move in the direction for unloading the cartridge.

9. An apparatus according to claim 1, further comprising a moving mechanism which moves the cartridge in response to an opening action of the cover of the cartridge chamber.

10. An apparatus according to claim 1, wherein said apparatus includes a camera.

11. An apparatus according to claim 1, wherein said second device causes the cartridge to be set in a predetermined position within the cartridge chamber where the operation part of the cartridge does not engage said first device when the cover of the cartridge chamber is in an open state.

12. An apparatus according to claim 11, further comprising a canceling device which cancels an action of said second device in response to a closing action of the cover of the cartridge chamber.

13. An apparatus according to claim 12, further comprising means for canceling the action of said second device without responding to the closing action of the cover of the cartridge chamber.

14. An apparatus according to claim 1, wherein said second device permits the operation part of the cartridge and the first device to engage each other only when the cover of the cartridge chamber is closed.

15. An apparatus adapted for an image recording medium cartridge having a cartridge cover for opening and closing an opening part of the cartridge, for passing an image recording medium therethrough, and an operation part for operating the cartridge cover, the apparatus comprising:
   a) a cartridge chamber in which to load the cartridge;
   b) a cover of said cartridge chamber;
   c) a first device which engages and actuates the operation part of the cartridge; and
   d) a second device which prevents said first device and the operation part of the cartridge loaded in said cartridge chamber from engaging each other so long as said cover of said cartridge chamber is open.

16. An apparatus according to claim 15, wherein said apparatus includes a camera.

17. An apparatus according to claim 15, wherein said second device causes the cartridge to be set in a predetermined position within the cartridge chamber where the operation part of the cartridge does not engage said first device when the cover of the cartridge chamber is in an open state.

18. An apparatus according to claim 15, wherein said second device permits the operation part of the cartridge and the first device to engage each other only when the cover of the cartridge chamber is closed.

19. An apparatus adapted to use an image recording medium cartridge having a cartridge cover for opening and closing an opening part of the cartridge, for passing an image recording medium therethrough, and an operation part for operating the cartridge cover, the apparatus comprising:
   a) a first device which engages and actuates the operation part of the cartridge; and
   b) a second device which prevents said first device and the operation part of the cartridge from engaging each other so long as a cover of a cartridge chamber in which the cartridge is loaded is open.

20. An apparatus according to claim 19, wherein said second device causes the cartridge to be set in a predetermined position within the cartridge chamber where the operation part of the cartridge does not engage said first device when the cover of the cartridge chamber is in an open state.

21. An apparatus according to claim 19, wherein said second device permits the operation part of the cartridge and the first device to engage each other only when the cover of the cartridge chamber is closed.

22. An apparatus adapted to use an image recording medium cartridge having a cartridge cover for opening and closing an opening part of the cartridge, for passing an image recording medium therethrough, and an operation part for operating the cartridge cover, the apparatus comprising:

a) a cartridge chamber in which to load the cartridge;

b) a cover of said cartridge chamber;

c) a first device which engages and actuates the operation part of the cartridge; and d) a second device which prevents said first device and the operation part of the cartridge loaded in said cartridge chamber from engaging each other so long as said cover of said cartridge chamber is open.

23. An apparatus according to claim 22, wherein said second device causes the cartridge to be set in a predetermined position within the cartridge chamber where the operation part of the cartridge does not engage said first device when the cover of the cartridge chamber is in an open state.

24. An apparatus according to claim 22, wherein said second device permits the operation part of the cartridge and the first device to engage each other only when the cover of the cartridge chamber is closed.

25. A unit adapted for at least one of a camera and an apparatus adapted to use an image recording medium cartridge having a cartridge cover for opening and closing an opening part of said cartridge, for passing an image recording medium therethrough, and an operation part for operating the cover, the apparatus comprising:

a) a first device which engages and actuates the operation part of the cartridge; and b) a second device which prevents said first device and the operation part of the cartridge from engaging each other so long as a cover of a cartridge chamber in which the cartridge is loaded is open.

26. An apparatus according to claim 25, wherein said second device causes the cartridge to be set in a predetermined position within the cartridge chamber where the operation part of the cartridge does not engage said first device when the cover of the cartridge chamber is in an open state.

27. A unit according to claim 25, wherein said second device permits the operation part of the cartridge and the first device to engage each other only when the cover of the cartridge chamber is closed.

28. A unit adapted for at least one of a camera and an apparatus adapted to use an image recording medium cartridge having a cartridge cover for opening and closing an opening part of the cartridge, for passing an image recording medium therethrough, and an operation part for operating the cover the unit, comprising:

a) a cartridge chamber in which to load the cartridge;

b) a cover of said cartridge chamber;

c) a first device which engages and actuates the operation part of the cartridge; and d) a second device which prevents said first device and the operation part of the cartridge loaded in said cartridge chamber from engaging each other so long as said cover of said cartridge chamber is open.

29. An apparatus according to claim 28, wherein said second device causes the cartridge to be set in a predetermined position within the cartridge chamber where the operation part of the cartridge does not engage said first device when the cover of the cartridge chamber is in an open state.

30. A unit according to claim 28, wherein said second device permits the operation part of the cartridge and the first device to engage each other only when the cover of the cartridge chamber is closed.

31. An apparatus adapted for an image recording medium cartridge having a light-shield portion and an operation part for operating the light-shield portion, the apparatus comprising:

a) a first device which engages and actuates the operation part of the cartridge; and b) a second device which prevents the operation part of the cartridge and said first device from engaging each other so long as a cover of a cartridge chamber in which the cartridge is loaded is open.

32. An apparatus according to claim 31, wherein said apparatus includes a camera.

33. An apparatus according to claim 31, wherein said second device causes the cartridge to be set in a predetermined position within the cartridge chamber where the operation part of the cartridge does not engage said first device when the cover of the cartridge chamber is in an open state.

34. An apparatus according to claim 31, wherein said second device permits the operation part of the cartridge and the first device to engage each other only when the cover of the cartridge chamber is closed.

35. An apparatus adapted for an image recording medium cartridge having a light-shield portion and an operation part for operating the light-shield portion, the apparatus comprising:

a) a cartridge chamber in which to load the cartridge;

b) a cover of said cartridge chamber;

c) a first device which engages and actuates the operation part of the cartridge; and d) a second device which prevents said first device and the operation part of the cartridge loaded in said cartridge chamber from engaging each other so long as the cover of said cartridge chamber is open.

36. An apparatus according to claim 35, wherein said apparatus includes a camera.

37. An apparatus according to claim 35, wherein said second device causes the cartridge to be set in a predetermined position within the cartridge chamber where the operation part of the cartridge does not engage said first device when the cover of the cartridge chamber is in an open state.

38. An apparatus according to claim 35, wherein said second device permits the operation part of the cartridge and the first device to engage each other only when the cover of the cartridge chamber is closed.

39. An apparatus adapted to use an image recording medium cartridge having a light-shield portion and an operation part for operating the light-shield portion, the apparatus comprising:

a) a first device which engages and actuates the operation part of the cartridge; and b) a second device which prevents said first device and the operation part of the cartridge from engaging each other so long as a cover of a cartridge chamber in which the cartridge is loaded is open.

40. An apparatus according to claim 39, wherein said second device causes the cartridge to be set in a predetermined position within the cartridge chamber where the operation part of the cartridge does not engage said first device when the cover of the cartridge chamber is in an open state.

41. An apparatus according to claim 39, wherein said second device permits the operation part of the cartridge and the first device to engage each other only when the cover of the cartridge chamber is closed.

42. An apparatus adapted to use an image recording medium cartridge having a light-shield portion and an operation part for operating the light-shield portion, the apparatus comprising:

a) a cartridge chamber in which to load the cartridge;

b) a cover of said cartridge chamber;

c) a first device which engages and actuates the operation part of the cartridge; and d) a second device which prevents said first device and the operation part of the cartridge loaded in said cartridge chamber from engaging each other so long as the cover of said cartridge chamber is open.

43. An apparatus according to claim 42, wherein said second device causes the cartridge to be set in a predetermined position within the cartridge chamber where the operation part of the cartridge does not engage said first device when the cover of the cartridge chamber is in an open state.

44. An apparatus according to claim 42, wherein said second device permits the operation part of the cartridge and the first device to engage each other only when the cover of the cartridge chamber is closed.

45. A unit adapted for at least one of a camera and an apparatus adapted to use an image recording medium cartridge having a light-shield portion and an operation part for operating the light-shield portion, the unit comprising:

a) a first device which engages and actuates the operation part of the cartridge; and b) a second device which prevents said first device and the operation part of the cartridge from engaging each other so long as a cover of a cartridge chamber in which the cartridge is loaded is open.

46. An apparatus according to claim 45, wherein said second device causes the cartridge to be set in a predetermined position within the cartridge chamber where the operation part of the cartridge does not engage said first device when the cover of the cartridge chamber is in an open state.

47. A unit according to claim 45, wherein said second device permits the operation part of the cartridge and the first device to engage each other only when the cover of the cartridge chamber is closed.

48. A unit adapted for at least one of a camera and an apparatus adapted to use an image recording medium cartridge having a light-shield portion and an operation part for operating the light-shield portion, the unit comprising:

a) a cartridge chamber in which to load the cartridge;

b) a cover of said cartridge chamber;

c) a first device which engages and actuates the operation part of the cartridge; and d) a second device which prevents said first device and the operation part of the cartridge loaded in said cartridge chamber from engaging each other so long as the cover of said cartridge chamber is open.

49. An apparatus according to claim 48, wherein said second device causes the cartridge to be set in a predetermined position within the cartridge chamber where the operation part of the cartridge does not engage said first device when the cover of the cartridge chamber is in an open state.

50. A unit according to claim 48, wherein said second device permits the operation part of the cartridge and the first device to engage each other only when the cover of the cartridge chamber is closed.

51. An apparatus adapted for an image recording medium cartridge having a cartridge cover for opening and closing an opening part of the cartridge for passing an image recording medium therethrough, and an operation part for operating the cartridge cover, the apparatus comprising:

a) a first device which engages and actuates the operation part of the cartridge, said first device being arranged in a cartridge chamber; and b) a second device which prevents the operation part of the cartridge and said first device from engaging each other so long as a cover of the cartridge chamber is open.

52. An apparatus according to claim 51, wherein said second device causes the cartridge to be set in a predetermined position within the cartridge chamber where the operation part of the cartridge does not engage said first device when the cover of the cartridge chamber is in an open state.

53. An apparatus according to claim 51, wherein said second device permits the operation part of the cartridge and the first device to engage each other only when the cover of the cartridge chamber is closed.

54. An apparatus adapted for an image recording medium cartridge having a cartridge cover for opening and closing an opening part of the cartridge, for passing an image recording medium therethrough, and an operation part for operating the cartridge cover, the apparatus comprising:

a) a cartridge chamber in which to load the cartridge;

b) a cover of said cartridge chamber;

c) a first device which engages and actuates the operation part of the cartridge, said first device being arranged in the cartridge chamber; and d) a second device which prevents said first device and the operation part of the cartridge loaded in said cartridge chamber from engaging each other so long as said cover of said cartridge chamber is open.

55. An apparatus according to claim 54, wherein said second device causes the cartridge to be set in a predetermined position within the cartridge chamber where the operation part of the cartridge does not engage said first device when the cover of the cartridge chamber is in an open state.

56. An apparatus according to claim 54, wherein said second device permits the operation part of the cartridge and the first device to engage each other only when the cover of the cartridge chamber is closed.

* * * * *

UNITED STATES PATENT AND TRADEMARK OFFICE
CERTIFICATE OF CORRECTION

PATENT NO. : 5,937,222

DATED : August 10, 1999

INVENTOR(S): MASAKAZU TAKU

It is certified that error appears in the above-identified patent and that said Letters Patent is hereby corrected as shown below:

COLUMN 10,
Line 57, "then" should read --than--.

COLUMN 13,
Line 44, "cover the unit" should read --cover--.

Signed and Sealed this

Twenty-eighth Day of March, 2000

Attest:

Q. TODD DICKINSON

Attesting Officer

Commissioner of Patents and Trademarks